US010318393B2

(12) United States Patent
Chelur Siddalingaiah et al.

(10) Patent No.: US 10,318,393 B2
(45) Date of Patent: Jun. 11, 2019

(54) HYPERCONVERGED INFRASTRUCTURE SUPPORTING STORAGE AND COMPUTE CAPABILITIES

(71) Applicant: HEWLETT PACKARD ENTERPRISE DEVELOPMENT LP, Houston, TX (US)

(72) Inventors: Raja Shekar Chelur Siddalingaiah, Cary, NC (US); Matti Vanninen, Cary, NC (US); Razvan George Costea, Durham, NC (US); Richard Carter, San Jose, CA (US); Evan Chiu, Cary, NC (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 68 days.

(21) Appl. No.: 15/431,525

(22) Filed: Feb. 13, 2017

(65) Prior Publication Data

US 2018/0232142 A1    Aug. 16, 2018

(51) Int. Cl.
*G06F 11/00*    (2006.01)
*G06F 11/20*    (2006.01)
(Continued)

(52) U.S. Cl.
CPC .......... *G06F 11/2089* (2013.01); *G06F 3/061* (2013.01); *G06F 11/0712* (2013.01); *G06F 11/1076* (2013.01); *G06F 11/2005* (2013.01); *G06F 12/0842* (2013.01); *G06F 12/0868* (2013.01); *G06F 2212/1016* (2013.01); *G06F 2212/214* (2013.01); *G06F 2212/62* (2013.01)

(58) Field of Classification Search
CPC ............. G06F 11/0709; G06F 11/0712; G06F 11/1076; G06F 11/108; G06F 11/2005; G06F 11/2089; G06F 11/2017; G06F 3/061; G06F 3/0647; G06F 3/0664; G06F 3/067; G06F 9/45558; G06F 12/0842; G06F 2009/45579; G06F 2212/62; G06F 12/0868; G06F 2212/1016; G06F 2212/214
See application file for complete search history.

(56) References Cited

U.S. PATENT DOCUMENTS 8,850,146 B1 *    9/2014    Majumdar .............. G06F 12/08
                                                             707/649
2003/0126315 A1 *    7/2003    Tan ....................... G06F 11/201
                                                             710/1
(Continued)

*Primary Examiner* — Joseph D Manoskey

(57) ABSTRACT

A hyperconverged data storage system including a storage array. A first node includes hardware and a virtualization layer supporting guest virtual machines running first applications. An active first virtual storage controller executing in the first virtualization layer is configured for handling IOs accessing the storage array. A second node includes hardware and a second virtualization layer supporting guest virtual machines running second applications. A second virtual storage controller executing in the second virtualization layer operates in a standby mode to the first virtual storage controller. An internal communication network facilitates communications between the first node and the second node. The first virtual storage controller when operating in active mode is configured for handling IOs originating from the first applications and the second applications.

22 Claims, 16 Drawing Sheets

(51) Int. Cl.
*G06F 3/06* (2006.01)
*G06F 12/0842* (2016.01)
*G06F 11/07* (2006.01)
*G06F 11/10* (2006.01)
*G06F 12/0868* (2016.01)

(56) References Cited

U.S. PATENT DOCUMENTS

| | | | | |
|---|---|---|---|---|
| 2012/0192006 A1* | 7/2012 | Qi | ............... | G06F 11/0757 |
| | | | | 714/6.22 |
| 2016/0203008 A1* | 7/2016 | Cui | ............... | G06F 9/455 |
| | | | | 718/1 |
| 2016/0328007 A1* | 11/2016 | Aranjani | ............... | G06F 1/3287 |

* cited by examiner

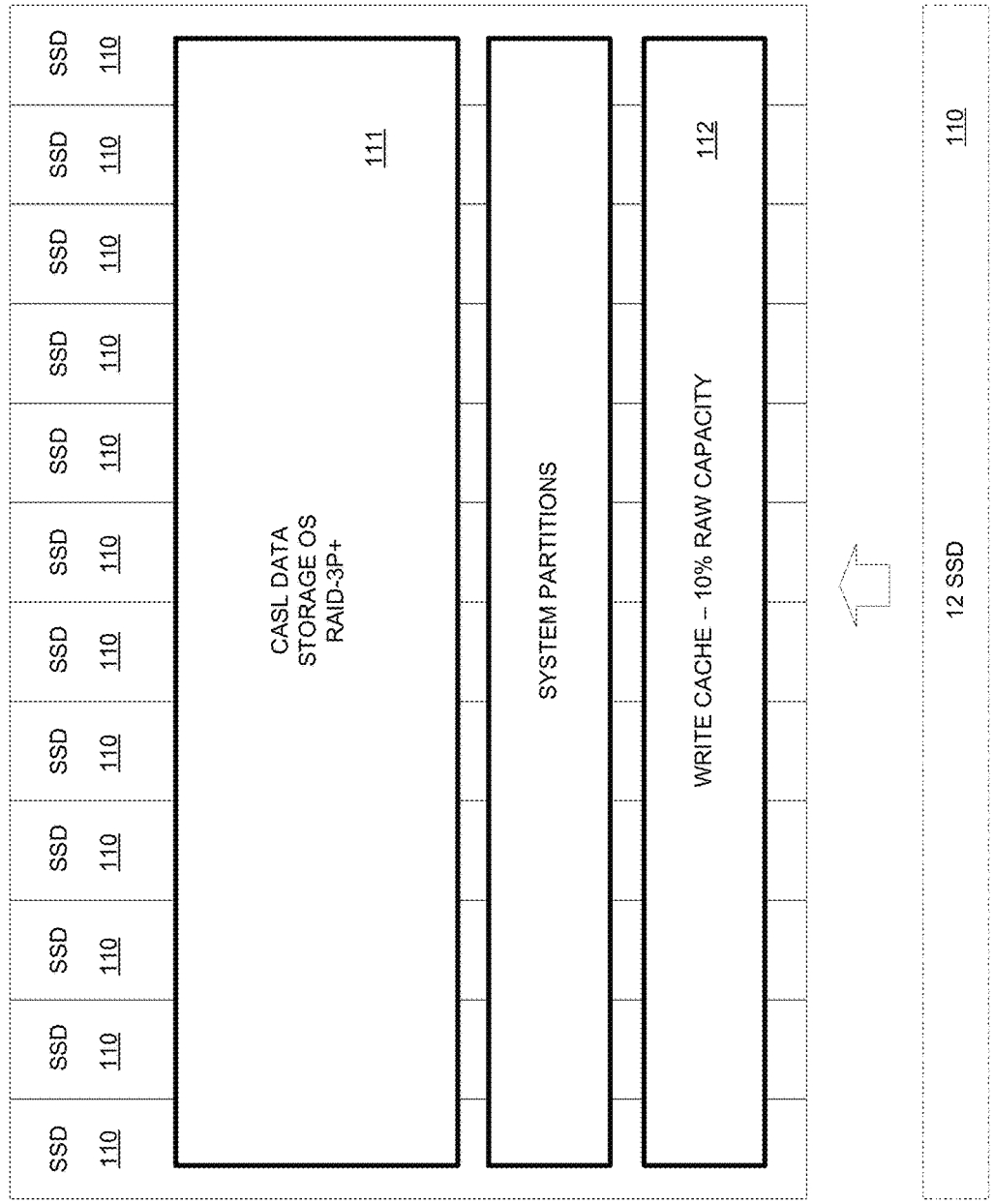

HYPERCONVERGED INFRASTRUCTURE SUPPORTING STORAGE AND COMPUTE CAPABILITIES

TECHNICAL FIELD

The present embodiments relate to data storage systems configured within an overall hyperconverged architecture to provide both compute and storage.

BACKGROUND

Network storage, also referred to as network storage systems or data storage systems, is computer data storage connected to a computer network providing data access to heterogeneous clients. Typically, network storage systems process a large amount of Input/Output (IO) requests, and high availability, speed, and reliability are desirable characteristics of network storage. A host system accesses the network storage. In addition, the host system is configured to execute a plurality of applications that access the network storage.

Because the host system accesses the network storage over a network, the performance of the network dictates how quickly data is delivered to and from the network storage. Performance of the network may be reflected through quality of service (QoS) metrics, such as error rates, throughput, latency, availability, jitter, etc. In some cases, because the network may be performing poorly, or below minimum standards set for the QoS metrics, access to the network storage will be compromised.

In other cases, because the network spans the space between the host system and the network storage, there will always be performance issues that are related to the network, even if the network is meeting minimum standards for QoS metrics. That is, some data access requirements cannot be met when performing access operations over a network.

What is needed is a storage device capable of processing IOs with high performance.

It is in this context that embodiments arise.

SUMMARY

The present embodiments are directed to providing increased performance to host systems when accessing data storage. An overall architecture is described that is configured to provide both compute and storage in a localized system. The architecture includes two nodes accessing shared storage (e.g., storage shelf) in a hyperconverged configuration including one or more virtualization layers and a physical data storage accessible outside of the virtualized space.

In one embodiment, a data storage system is disclosed and includes a storage array. The system includes a first node including first hardware and a first virtualization layer. The first hardware includes a first central processing unit (CPU). The first virtualization layer supports a first plurality of guest virtual machines utilizing the first hardware while running a plurality of first applications. The first virtualization layer also supports a first virtual storage controller operating in an active mode and configured for handling IOs requesting access to the storage array. The systems includes a second node including second hardware and a second virtualization layer. The second hardware includes a second CPU. The second virtualization layer supports a second plurality of guest virtual machines utilizing the second hardware while running a plurality of second applications. The second virtualization layer supports a second virtual storage controller operating in an standby mode to the first virtual storage controller. The system includes an internal communication network facilitating communications between the first node and the second node. In the system, the first virtual storage controller when operating in active mode is configured for handling the IOs originating from the first applications and the second applications and accessing the storage array.

In another embodiment, a data storage system includes a storage array, a first node, a second node, and an internal communication network. The first node includes first hardware, wherein the first hardware includes a first CPU. The second node includes second hardware, wherein the second hardware includes a second CPU. The internal communication network facilitates communications between the first node and the second node. During operation, the first CPU and the second CPU are configured to operate on the first node a first virtualization layer supporting a first plurality of guest virtual machines utilizing the first hardware when running a plurality of first applications. The first and second CPUs are configured to instantiate in the first virtualization layer a first virtual storage controller operating in an active mode and that is configured for handling IOs requesting access to the storage array. The first and second CPUs configure the first virtual storage controller when operating in active mode to handle IOs from the first applications and the second applications and accessing the storage array.

In still another embodiment, a method for storing data is disclosed. The method includes providing a storage array. The method includes providing a first node comprising first hardware, wherein the first hardware includes a first central processing unit (CPU). The method includes providing a second node comprising second hardware, wherein the second hardware includes a second CPU. The method includes providing an internal communication network facilitating communications between the first node and the second node. The method includes operating on the first node a first virtualization layer supporting a first plurality of guest virtual machines utilizing the first hardware and running a plurality of first applications. The method includes instantiating in the first virtualization layer a first virtual storage controller operating in an active mode and configured for handling IOs requesting access to the storage array. The method includes operating on the second node a second virtualization layer supporting a second plurality of guest virtual machines utilizing the second hardware and running a plurality of second applications. The method includes instantiating in the second virtualization layer a second virtual storage controller operating in an standby mode to the first virtual storage controller. The method includes configuring the first virtual storage controller when operating in active mode to handle IOs from the first applications and the second applications and accessing the storage array.

Other aspects will become apparent from the following detailed description, taken in conjunction with the accompanying drawings.

BRIEF DESCRIPTION OF THE DRAWINGS

The embodiments may best be understood by reference to the following description taken in conjunction with the accompanying drawings.

For example.

FIG. 7A-1 illustrates a write-buffering mechanism partitioning a portion of each SSD (e.g., in a shared configuration) for write-buffering in a hyperconverged data storage system including all SSDs, such as an all flash array (AFA), in accordance with one embodiment of the present disclosure.

FIG. 7B-1 illustrates a write-buffering mechanism implemented in a hybrid array including HDDs and SSDs configured in a hyperconverged data storage system, wherein at least a portion of the SSDs are dedicated for write-buffering, in accordance with one embodiment of the present disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure provide increased performance to host systems when accessing data storage. An overall architecture is described that is configured to provide both compute and storage in a localized system. The architecture includes two nodes each including a virtualization layer, and a shared, physical data storage accessible outside of the virtualized space. In particular, each node includes one or more virtual machines (VMs) (e.g., running customer VMs), and a virtualized storage controller (storage VM) that is running a storage operating system for accessing the shared data storage. The VMs of both nodes are serviced by a single, active storage VM, wherein the other storage VM on the other node operates in a standby mode. Both the active and standby storage VMs access the same shared shelf of storage. By having shared storage, one copy of the data need be stored. Data persistence may be provided through application of at least one redundant array of inexpensive disks (RAID) standardized levels (e.g., RAID 0-6, Triple Parity RAID, Triple+ Parity RAID, etc.). In case of failover, VMs from the failed node migrate to the other node, and the standby storage VM now becomes the active storage VM.

With the above general understanding of the various embodiments, example details of the embodiments will now be described with reference to the various drawings. Similarly numbered elements and/or components in one or more figures are intended to generally have the same configuration and/or functionality. It will be apparent, that the present embodiments may be practiced without some or all of these specific details. In other instances, well-known process operations have not been described in detail in order not to unnecessarily obscure the present embodiments.

HCI Architecture

Figure 1:
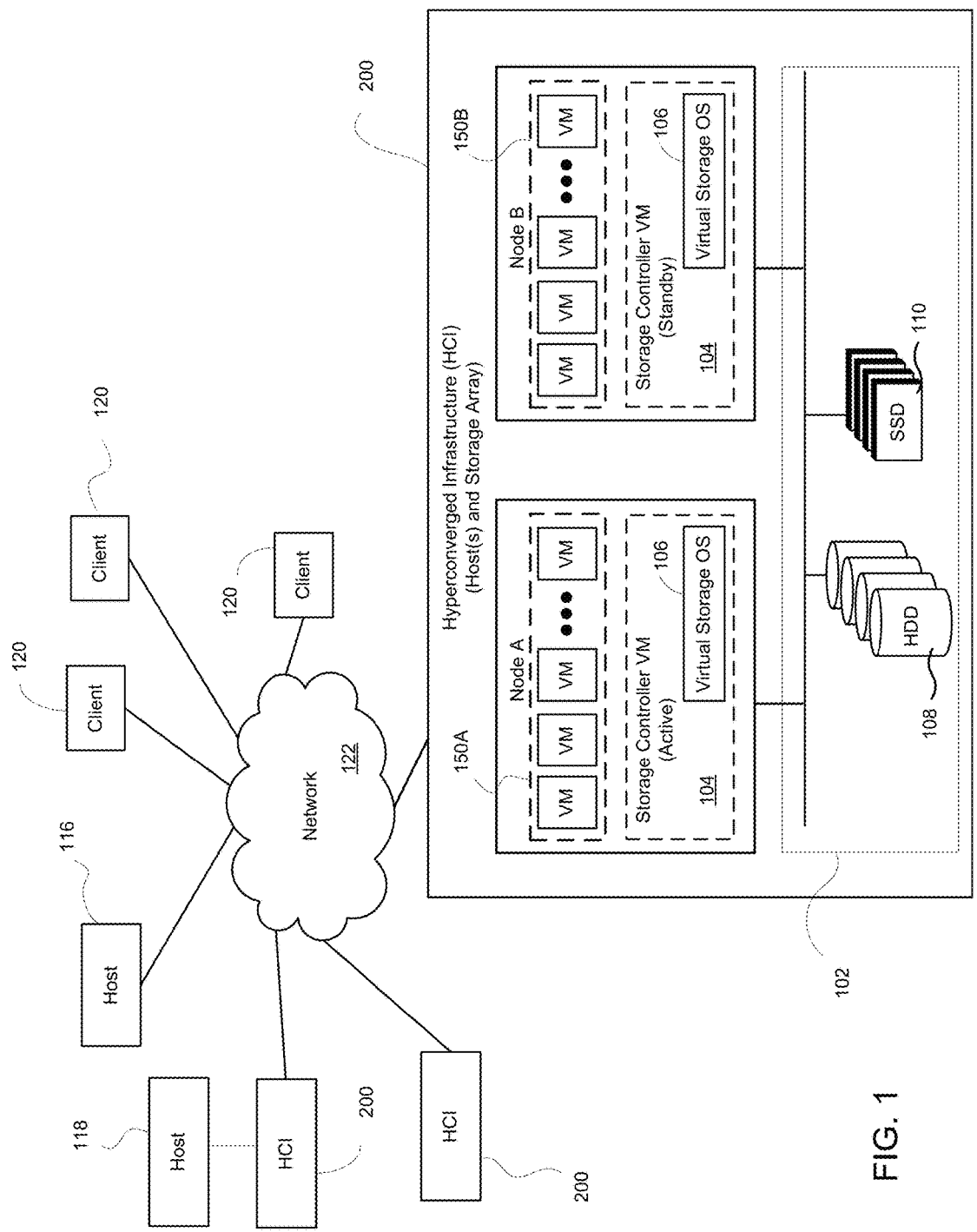
FIG. 1 depicts a data storage system, in accordance with one embodiment of the present disclosure.

FIG. 1 depicts a data storage system that provides both network and local storage, according to embodiments. In the example architecture of FIG. 1, one or more hyperconverged infrastructures (HCI) 200 provide both compute (e.g., host applications) and storage. Each HCI 200 is configured to provide a virtualization layer supporting one or more virtual machines (VMs) and a physical storage array 102 that is configured to provide local or networked storage. In particular, each HCI 200 includes two nodes (e.g., node A and node B) accessing a shared storage array 102 (e.g., storage shelf). Each of the nodes A and B is configured in a hyperconverged configuration including at least one virtualization layer utilizing underlying hardware, and a physical data storage accessible outside of the virtualized space. Each of nodes A and B includes one or more VMs 115 (e.g., VMs 115A on node A and VMs 115B on node B) running on the corresponding virtualization layer.

Each of nodes A and B includes a virtualized storage controller (herein referred to as "storage VM") 104 executing a storage operating system (OS) 106 used to perform operating system functions for the corresponding storage controller when accessing the storage array 102 shared across the two nodes A and B. The storage VMs operating on node A and node B cooperatively manage access to the storage array 102, such as implementing an active/standby configuration on the storage controllers to provide robust access to the storage array 102. The storage operating system 106 is a multitasking system able to execute several tasks concurrently, wherein one or more tasks are configured to process IO requests. Tasks that process IOs are referred to as foreground tasks, wherein when processing IO requests, resources from the storage array 102 are required. Background tasks are tasks that do not cause a host initiator to wait for their output. As an example, background tasks may include system maintenance tasks (e.g., processing an alert when resource consumption reaches a threshold, taking a scheduled snapshot, garbage collection (GC), etc.).

For network storage, one or more storage arrays 102 provide storage services to one or more host applications executing on host servers 116, 118 and/or host applications on HCIs 200. In addition, one or more storage arrays 102 may provide storage services to one or more clients 120. The configuration of the one or more storage arrays 102 working in combination will depend on the implementation of the storage arrays 102 and the demand by application. Network 122 provides transport for the data exchanges between the one or more storage arrays 102 and hosts 116 or clients 120.

For local storage, a particular storage array 102 provided by a corresponding HCI 200 is configured to provide storage services to one or more host applications executing on the corresponding HCI 200. That is, access to the storage array 102 occurs locally within the corresponding HCI 200 and without involving network communications. Also, a host server 118 may be directly connected to a storage array 102 within a corresponding HCI 200, such that the host server 118 need not communicate through network 122 when accessing the corresponding storage array 102. In addition, the storage array 102 can also be configured to provide network data storage (e.g., to host applications residing on other HCIs 200 or host servers 116, 118, as previously described. The configuration of a particular storage array 102 will depend on the implementation of the storage array and the demand by application.

Each of the storage arrays 102 includes one or more hard disk drives (HDD) 108 and/or one or more solid state drives (SSD) 110, also referred to herein as flash cache, in embodiments. In one particular, embodiment a storage array 102 includes one or more SSDs 110 in a full flash memory configuration. Access to a particular physical storage array 102 is through a corresponding and active storage controller 104 that is virtualized on node A, in one embodiment. That is, VMs of both nodes A and B are serviced by the active storage VM operating on one node—node A, wherein the storage VM on node B is operating in standby mode. Additional examples regarding the system are provided below.

Figure 2A:
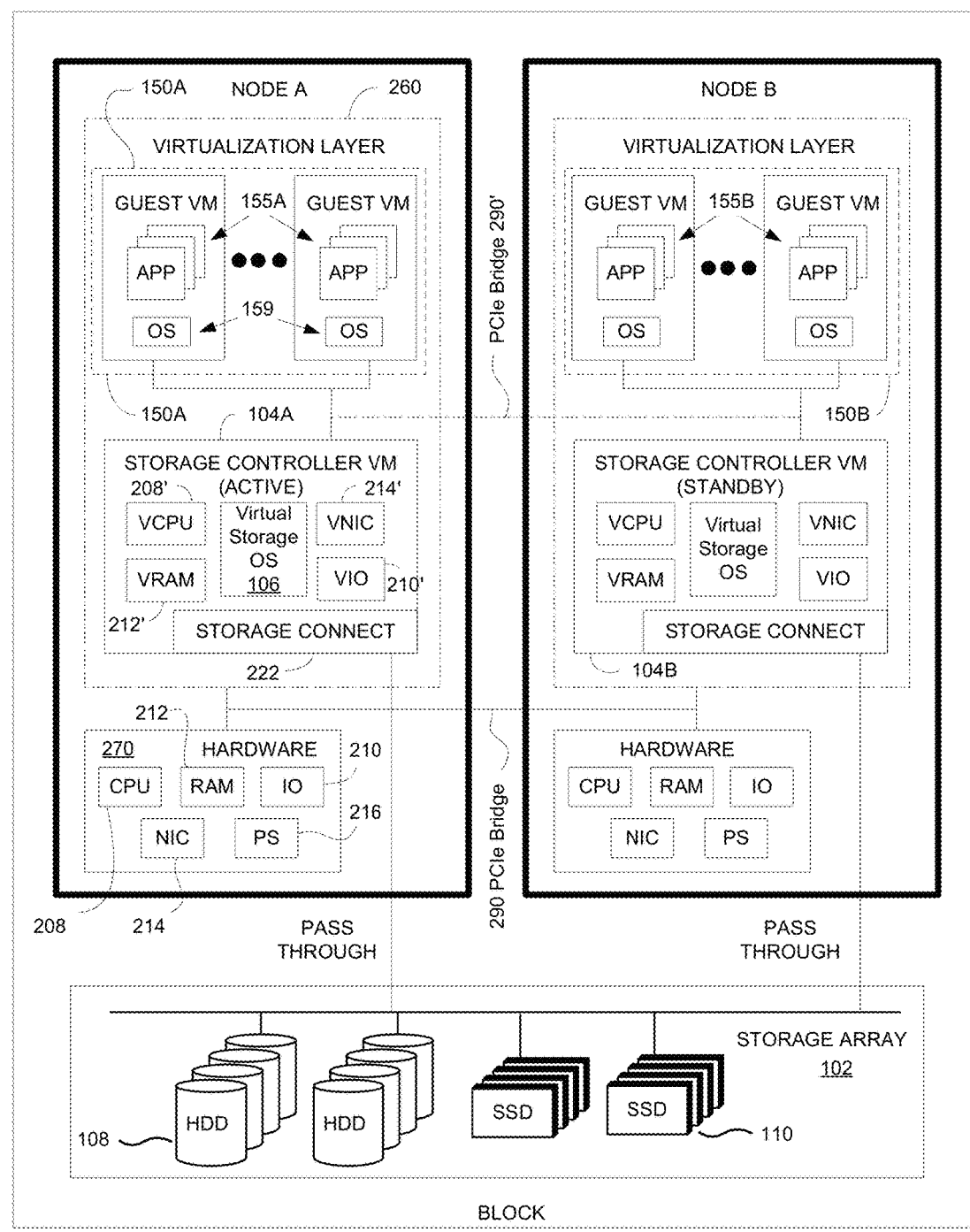
FIG. 2A illustrates a hyperconverged infrastructure providing storage and computing resources and including two nodes providing virtual machines, wherein the two nodes access shared storage, in accordance with one embodiment of the present disclosure.

FIG. 2A illustrates a hyperconverged infrastructure (HCI) 200 including two nodes (e.g., node A and node B) providing virtualization, and an underlying, physical data storage array 102 providing shared storage to the nodes A and B outside of the virtualized environment, in accordance with one embodiment of the present disclosure. In one embodiment, HCI 200 may be implemented within a single structure to provide both compute (virtualized) and storage resources. That is, the compute resources available for running the storage array of an integrated system may also be configured for executing one or more virtual machines, and for executing the virtual storage controllers operating in an active/standby configuration.

Node A and node B are generally configured similarly and each includes a virtualization layer 260 supporting a plurality of guest VMs. In general, a virtualization layer 260 executes to create and manage the operating systems of corresponding guest VMs, wherein the guest VMs are configured to execute one or more applications. For example, node A includes hardware 270 and a virtualization layer 260 that creates and manages the operating systems 159 of one or more guest VMs 150A, wherein the guest VMs 150A are each executing one or more applications 155A. Similarly, node B includes hardware 270 and a virtualization layer 260 that creates and manages the operating systems 159 of one or more guest VMs 150B, wherein the guest VMs 150B are each executing one or more applications 155B.

In particular, the virtualization layer 260 of each node A and node B is configured to manage and allocate resources from the corresponding physical hardware 270 for utilization by the VMs, such that virtual hardware present in each VM is supported by underlying hardware 270. The physical hardware 270 in each of node A and node B includes components, such as a central processing unit (CPU) 208, general purpose random access memory (RAM) 212, IO module 210 for communicating with external devices (e.g., USB port, terminal port, connectors, plugs, links, etc.), one or more network interface cards (NICs) 214 for exchanging data packages through a network (e.g., network 122 of FIG. 1), and one or more power supplies 216. Other hardware components, such as temperature sensor, are not shown for brevity and clarity. As such, the virtualization layer 260 provides a virtualized set of hardware, supported by underlying physical hardware 270, to each guest operating system of a corresponding guest VM. For example, virtualization layer 260 in node A provides virtualized hardware to each of the guest VMs 150A, and virtualization layer 260 in node B provides virtualized hardware to each of the guest VMs 150B.

The storage array 102 of HCI 200 includes one or more HDDs 108 and/or one or more SSDs 110. In one embodiment, the storage array 102 is configured as an all flash system including a plurality of SSDs configured for supporting cache storage and permanent storage. In another embodiment, the storage array 102 is configured as a hybrid system including a plurality of SSDs configured for supporting cache storage, and a plurality of HDDs configured for supporting permanent storage. Access and management of the storage array 102 is provided by virtual storage controllers 104A and 104B (also referred to as storage VMs), in combination. For example, the virtual storage controllers 104A and 104B operating on node A and node B cooperatively manage access to the storage array 102, such as implementing an active/standby configuration on the storage controllers to provide robust access to the storage array 102. In particular, virtual storage controller 104A executing in the virtualization layer 260 of node A operates in an active mode and is configured for handling IOs requesting access to the storage array. The virtual storage controller 104A is configured in a pass-through mode to bypass the virtualization layer 260. For example, virtual storage controller 104A communicates with storage array 102 for direct internet small computer system interface (iSCSI) access. The IOs requiring resources from the storage array 102 are generated by applications 155A and 155B executing on the guest VMs 150A of node A and guest VMs 150B of node B. Virtual storage controller 104B executing in the virtualization layer 260 of node B operates in standby mode to the virtual storage controller 104A.

It is important to note that either virtual storage controller 104A and 104B can operate in the active mode, and either controller can operate in the standby mode, such that when both controllers are on-line, one controller is designated as the active controller and functions to service IOs from one or more hosts, while the other controller remains in standby mode ready to step in and handle the IOs when a failure (real or instantiated) to the active controller occurs. As such, the active virtual storage controller 104A and the standby virtual storage controller 104B are configured similarly and mirrored appropriately (e.g., mirroring states), such that either virtual storage controller when designated active can access (e.g., write, read, etc.) data stored in any of the storage mediums of the storage array 102, including a corresponding write cache SSD, read cache SSD, and HDD to serve IOs from applications from hosts.

Even though one controller acts in active mode and the other controller acts in standby mode, when operational both virtual storage controllers 104A and 104B have simultaneous access to the storage array. That is, both storage controllers 104a and 104B are configured in a pass-through mode to bypass corresponding virtualization layers 260 for direct iSCSI access to storage array 102, for example. As shown in FIG. 2A, both the active virtual storage controller 104A and the standby virtual storage controller 104B access the same storage array 102. By having shared storage, only one copy of the data need be permanently stored in the storage array 102. For example, data persistence may be provided through application of mirroring and/or striping with parity bits using at least one of the RAID standardized levels (e.g., 0-6). In that manner, the data is persisted even though a physical disk may fail.

In addition, the active virtual storage controller 104A further includes virtualized hardware, such as VCPU 208', RAM 212' (e.g., used by the applications 155A), VIO module 210' for communicating with external devices (e.g., USB port, terminal port, connectors, plugs, links, etc.), one or more VNICs 214' for exchanging data packages through a network, and other virtualized hardware components. In addition, a virtual storage connect module 222 is configured for sending and receiving data to and from the HDDs 108 and SSDs 110. In one embodiment, the virtual storage connect module is able to directly access the physical storage array 102 without using the virtualization layer 260. That is, the virtualization layer 260 operates in a pass-through mode with regards to accessing the storage array 102. In one embodiment, the virtual storage connect module 222 may communicate with a physical storage connect module (not shown) in hardware 270. In one embodiment, standby virtual storage controller 104B includes the same components as active virtual storage controller 104A.

In one embodiment, an internal communication network 290 (e.g., bus) facilitates communications between node A and node B, such as between the hardware components 270 of nodes A and B. For example, bus 290 may be a PCIe bridge. In particular, internal bus 290 provides connectivity between the components of the active virtual storage controller 104A and the components of the standby virtual storage controller 104B, for example to implement an active/standby array configuration, wherein the active controller 104A services IO requests from one or more hosts and the standby controller 104B services write cache mirroring requests (e.g., mirrors state) while remaining ready to assume the primary responsibility of servicing IOs when a failure occurs at the active virtual storage controller 104A.

As previously described, the active virtual storage controller services IOs from applications 155A and 155B on both node A and node B. In one embodiment, the standby virtual storage controller 104B sends and receives over the internal bus 290 a plurality of communications associated with the IOs originating from the applications 155B on node B to and from the active virtual storage controller 104A for accessing the storage array. That is, there is direct communication between the components of the active virtual storage controller 104A and the standby virtual storage controller 104B. For purposes of illustration, this direct communication is shown as a virtual bus 290', though the actual communication is performed over the physical bus 290. In still another embodiment, the IOs originating from applications 155b on node B are directly delivered to the virtual storage controller 104A of node A, and bypass the standby virtual storage controller 104B.

Figure 2B:
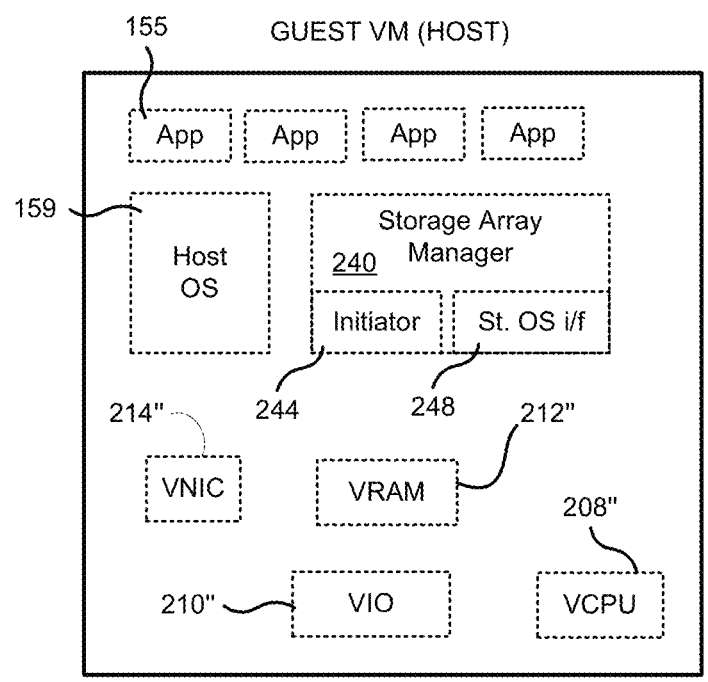
FIG. 2B illustrates a virtualized host system operating on the hyperconverged infrastructure providing storage and computing resources of FIG. 2A, in accordance with one embodiment of the present disclosure.

FIG. 2B illustrates a virtual host system 150 (e.g., guest VM) operating on the hyperconverged data storage system of FIG. 2A, in accordance with one embodiment of the present disclosure. The virtual host system 150 may be a guest VM operating on one of node A or node B of FIG. 2A. Host system 150 is a virtual computing device including a VCPU 208", virtual memory (RAM) 212", a VNIC card 214", and a virtual IO module 210", as well as other virtual components not shown for brevity and clarity. The host 150 includes one or more applications 155 executing on VCPU 208", and a virtual host operating system 159.

In addition, the host 150 includes a computer program storage array manager 240 that provides an interface for accessing storage array 102 to applications 155. Storage array manager 240 includes an initiator 244 and a storage OS interface program 248. When an IO operation is requested by one of the applications 155, the initiator 244 establishes a connection with storage array 102 in one of the supported formats (e.g., iSCSI, or any other protocol). The storage OS interface 248 provides console capabilities for managing the storage array 102 by communicating with the active virtual storage controller 104A and the storage OS 106 executing therein.

Figure 3:
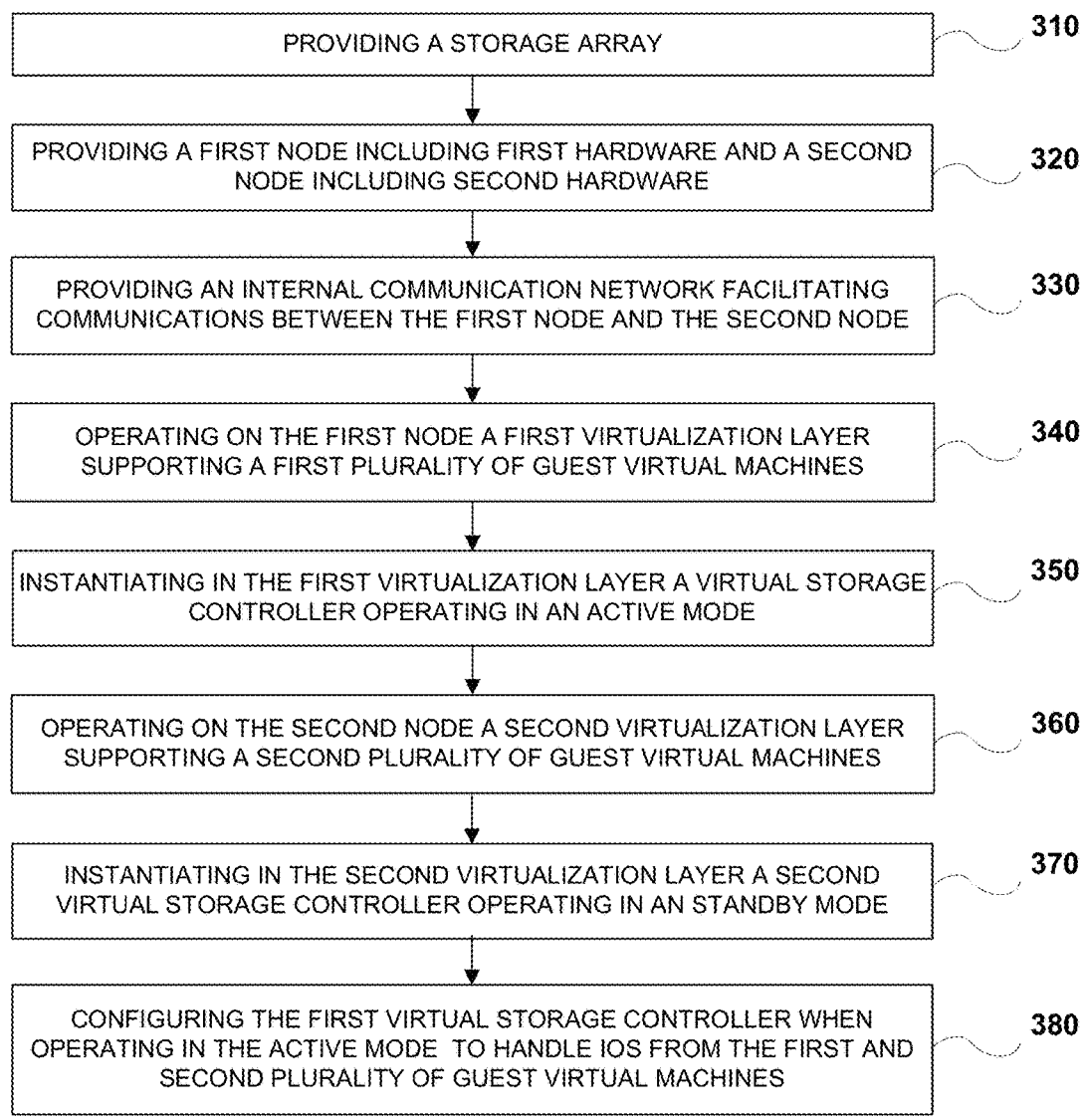
FIG. 3 is a flow diagram illustrating a method for storing data in a hyperconverged infrastructure providing virtualized compute capabilities and shared physical storage, in accordance with one embodiment of the present disclosure.

FIG. 3 is a flow diagram 300 illustrating a method for storing data in a hyperconverged infrastructure providing virtualized compute capabilities and shared physical storage, in accordance with one embodiment of the present disclosure. In one embodiment, flow diagram 300 is implemented within active virtual storage controller 104A and/or standby virtual storage controller 104B of FIG. 1 and FIGS. 2A-2B.

At operation 310, the method includes providing a storage array. The storage array includes one or more HDDs and/or one or more SSDs. For example, the storage array may be in an all flash configuration of SSDs, or a hybrid storage system including HDDs and SSDs. The storage array is configured to provide localized storage services to one or more host applications running locally on VMs of the local HCI, or to provide network storage services to one or more host applications running on remote host servers or VMs on remote host servers accessed through a communication network. In addition, different configurations of the storage array are possible, to include one or more of cache memory and permanent storage.

At operation 320, the method includes providing a first node including first hardware, such as a first CPU. In addition, the method includes providing a second node including second hardware, such as a second CPU. Other hardware components in both nodes include RAM, IO modules, NICs, power supplies, etc.

At operation 330, the method includes providing an internal communication network (e.g., bus) facilitating communications between the first node and the second node. For example, the communication network. For example, internal network 290 provides connectivity between the components (e.g., virtual components) of the virtual storage controllers operating on both the first node and second node. In that manner, the storage controllers can implement an active/standby configuration, such that one virtual storage controller acts in active mode, and one virtual storage controller acts in standby mode with mirrored state, and remains ready to assume the primary responsibilities of servicing IOs when a failure occurs at the active virtual storage controller.

At operation 340, the method includes operating on the first node a first virtualization layer supporting a first plurality of guest virtual machines. The first virtualization layer manages the underlying first hardware to support the guest VMs executing and/or running a plurality of first applications on the first node. In particular, the virtualization layer creates and manages the operating systems of the guest VMs, wherein the operating systems are executing the first applications. Further, the virtualization layer manages and allocates the physical resources from the first hardware, such that virtual hardware present in each of the guest VMs is supported by at least a portion (e.g., space, time, etc.) of corresponding hardware. As such, the first virtualization layer provides a virtualized set of hardware supported by underlying physical hardware to each operating system of corresponding guest VMs.

At operation 350, the method includes instantiating in the first virtualization layer a first virtual storage controller operating in an active mode, wherein the first storage controller is configured for handling IOs requesting access to the storage array. The IOs may originate from the applications running on the first node or the second node. The storage controller includes a storage operating system used to perform operating system functions (e.g., for handling IOs) used to access the physical storage array that is shared across the two nodes.

At operation 360, the method includes operating on the second node a second virtualization layer supporting a second plurality of guest virtual machines. The second virtualization layer manages the underlying second hardware to support the guest VMs executing and/or running a plurality of second applications on the second node. In particular, the virtualization layer creates and manages the operating systems of the guest VMs, wherein the operating systems are executing the second applications. Further, the virtualization layer manages and allocates the physical resources from the second hardware, such that virtual hardware present in each of the guest VMs is supported by at least a portion (e.g., space, time, etc.) of corresponding hardware. As such, the second virtualization layer provides a virtualized set of hardware supported by underlying physical hardware to each operating system of corresponding guest VMs.

At operation 370, the method includes instantiating in the second virtualization layer a second virtual storage controller operating in a standby mode to the first virtual storage controller. Both the first and second virtual storage controllers are configured to simultaneously access the shared storage array. That is, the second storage controller is also configured for handling IOs requesting access to the storage array and includes a storage operating system used to perform operating system functions (e.g., for handling IOs) used to access the physical storage array that is shared across the two nodes. However, when the second virtual storage controller is operating in standby mode, IOs (originating from the second applications) are redirected from the second virtual storage controller to the first storage controller on the first node operating in active mode, or the second virtual storage controller actually never handles those IOs as they are sent directly to the first virtual storage controller on the first node.

At operation 380, the method includes configuring the first virtual storage controller, when operating in active mode, to handle IOs requesting access to the storage array both from the first applications and the second applications. The first applications are executing on first VMs on the first node, and the second applications are executing on second VMs on the second node. Both the first and second virtual storage controller can operate in the active or standby mode, however, only one controller (e.g., the first controller) acts is designated as the active controller to service IOs from applications on both nodes when both first and second virtual storage controllers are on-line.

In one embodiment, the first virtual storage controller is configured for direct access to the storage array. For example, the storage controller is configured to operate in a pass-through mode with regards to the first virtualization layer, such that accesses to the storage array from the virtual storage controller bypasses the first virtualization layer. For example, the first virtualization layer may be configured to provide pass-through to the storage array for the first virtual storage controller. In one embodiment, the first virtual storage controller is configured for direct iSCSI access to the storage array.

As previously described, both the first and second virtual storage controller can operate in the active or standby mode. As such, when the active first virtual storage controller fails, a failover process is performed to enable the second virtual storage controller to operate in active mode. In particular, the failover process in the method includes operating the second virtual storage controller in the active mode to handle the IOs when the first virtual storage controller fails. As such, the second virtual storage controller is configured for direct access to the storage array, and includes operating in a pass-through mode with regards to the second virtualization layer, such that accesses to the storage array from the second virtual storage controller bypasses the second virtualization layer. The second virtualization layer may be configured to provide pass-through to the storage array for the second virtual storage controller. In one embodiment, the second virtual storage controller is configured for direct iSCSI access to the storage array.

Figure 4A:
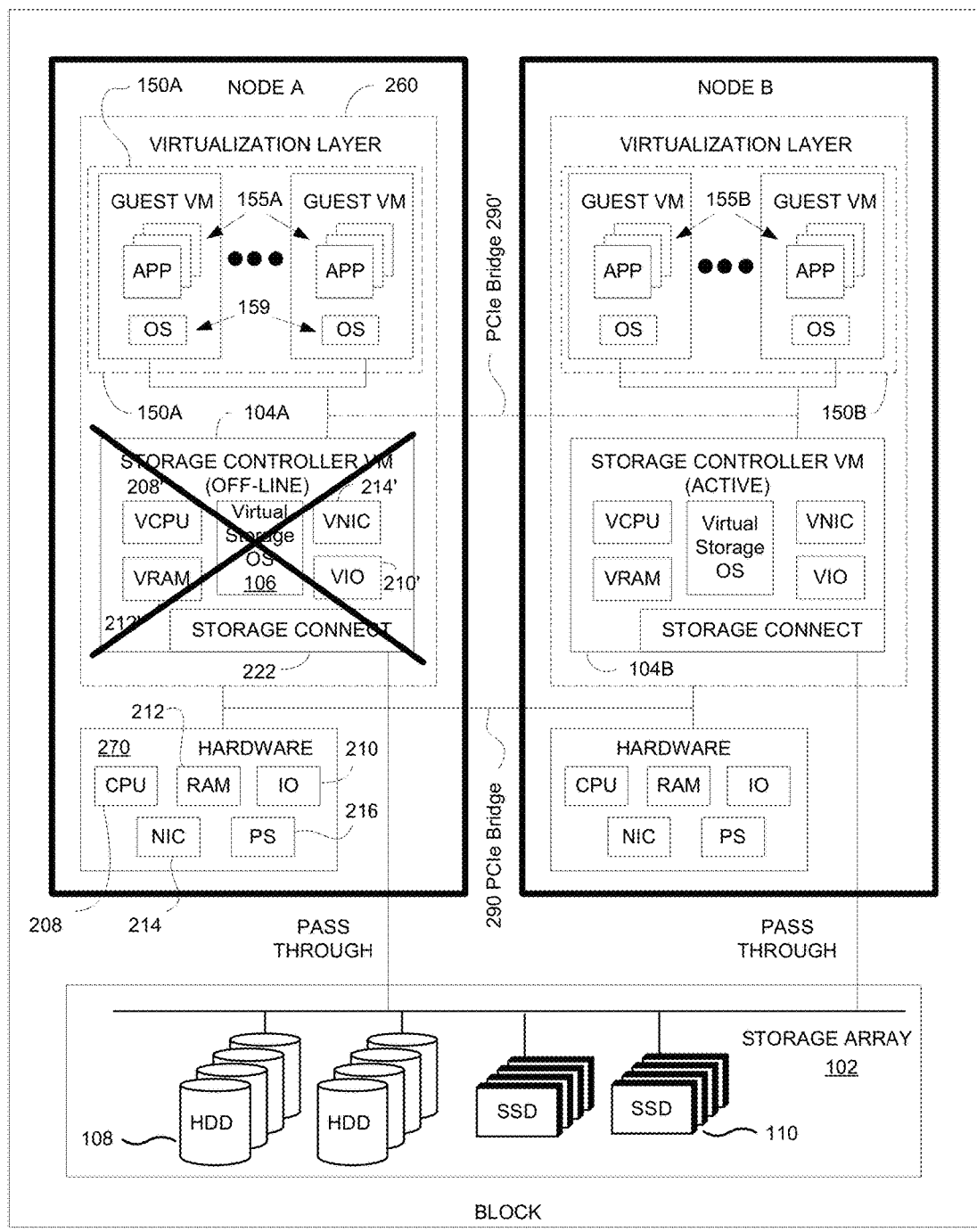
FIG. 4A illustrates a failover operation in a hyperconverged infrastructure including two nodes providing virtual machines, wherein the two nodes access shared storage, in accordance with one embodiment of the present disclosure.

FIG. 4A illustrates a failover operation in the hyperconverged infrastructure 200, first introduced in FIG. 2A, including two nodes providing virtual machines, wherein the two nodes access shared storage, in accordance with one embodiment of the present disclosure. As shown, the virtual storage controller 104A operating on node A has failed and is off-line. As such, IOs requesting access to the storage array 102 can no longer be handled by the virtual storage controller 104A. In that case, a failover operation is performed to switch the virtual storage controller 104B to operate in active mode in order to handle IOs from applications executing on VMs on both node A and node B. Also, the virtual storage controller 104B is configured in a pass-through mode for direct iSCSI access to the storage array that bypasses virtualization layer 260 on node B.

In one embodiment, even though the virtual storage controller 104A has failed, the remaining functionality of node A may remain, such that VMs 150 running on the virtualization layer 260 may still be fully executing. That is, the failure may be limited to one or more components of the virtual storage controller 104A, and as such the applications 155A may still be instantiated and running on VMs 150A of node A. In that case, the IOs from applications 155A are delivered over the internal network 290 (e.g., PCIe bus) to the virtual storage controller 104B, now acting in active mode, for storage access.

Figure 4B:
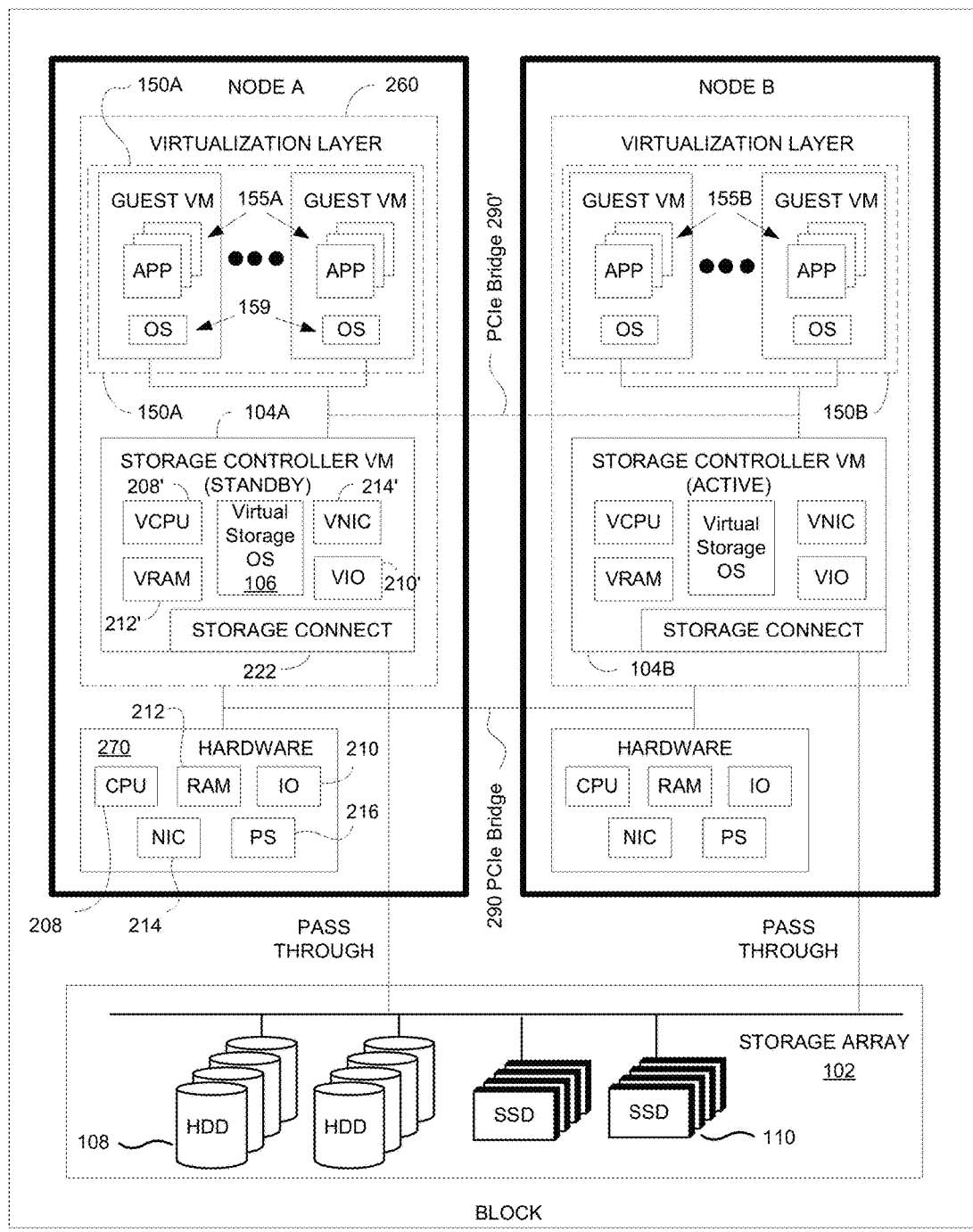
FIG. 4B illustrates a failover operation in a hyperconverged infrastructure including two nodes providing virtual machines and cooperatively provide virtual storage controllers, wherein the two nodes access shared storage, and wherein the nodes switch their modes of operation during failover, in accordance with one embodiment of the present disclosure.

FIG. 4B illustrates a failover operation in a hyperconverged infrastructure including two nodes providing virtual machines and cooperatively provide virtual storage controllers, wherein the two nodes access shared storage, and wherein the nodes switch their modes of operation during failover, in accordance with one embodiment of the present disclosure. In particular, for a period of time during failover, virtual storage controller 104A may not be able to act in a standby capacity, for example while the storage controller 104A is off-line. The virtual storage controller 104A may be rebooted and/or reconfigured for normal operations, in which case, the virtual storage controller 104A on node A may then come back on-line and operate in standby mode, while the virtual storage controller 104B remains in active mode. This allows for storage control redundancy.

Figure 4C:
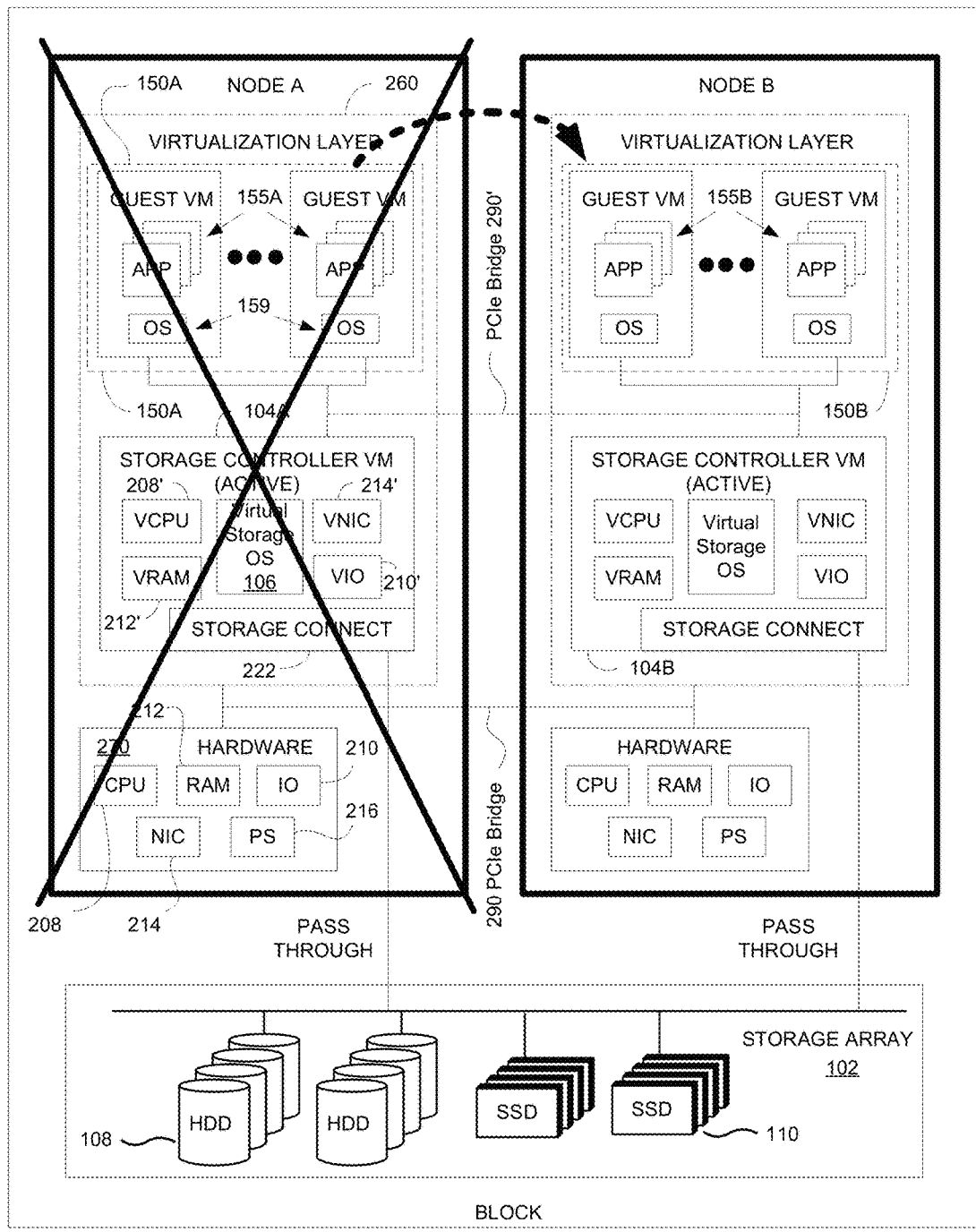
FIG. 4C illustrates a failover operation in a hyperconverged infrastructure including two nodes providing virtual machines and cooperatively provide virtual storage controllers, wherein the two nodes access shared storage, and wherein VMs of a node that is experiencing catastrophic failure migrate over to the remaining node, in accordance with one embodiment of the disclosure.

FIG. 4C illustrates a failover operation in a hyperconverged infrastructure including two nodes providing virtual machines and cooperatively provide virtual storage controllers, wherein the two nodes access shared storage, and wherein VMs of one node migrate over to another node, in accordance with one embodiment of the disclosure. In particular, the failure on node A may be catastrophic. In that case, the virtual storage controller 104A has failed, and also all of the guest VMs 150A operating on node A are no longer instantiated. Regarding the storage controller functionality, the failover operation includes switching the virtual storage controller 104B to operate in active mode in order to handle IOs from applications executing on VMs on both node A and node B. Also, the virtual storage controller 104B is configured in a pass-through mode for direct iSCSI access to the storage array that bypasses virtualization layer 260 on node B. In addition, an auto-migration may be implemented to migrate the guest VMs 150A from node A to node B, such that the guest VMs 150A are now instantiated in the virtualization layer 260 of node B. The migration process allows migration of the VMs 150A between separate hardware hosts that are sharing the same storage array 102, in one embodiment. The migration process typically occurs without any fluctuation in service to the end customer.

Figure 5A:
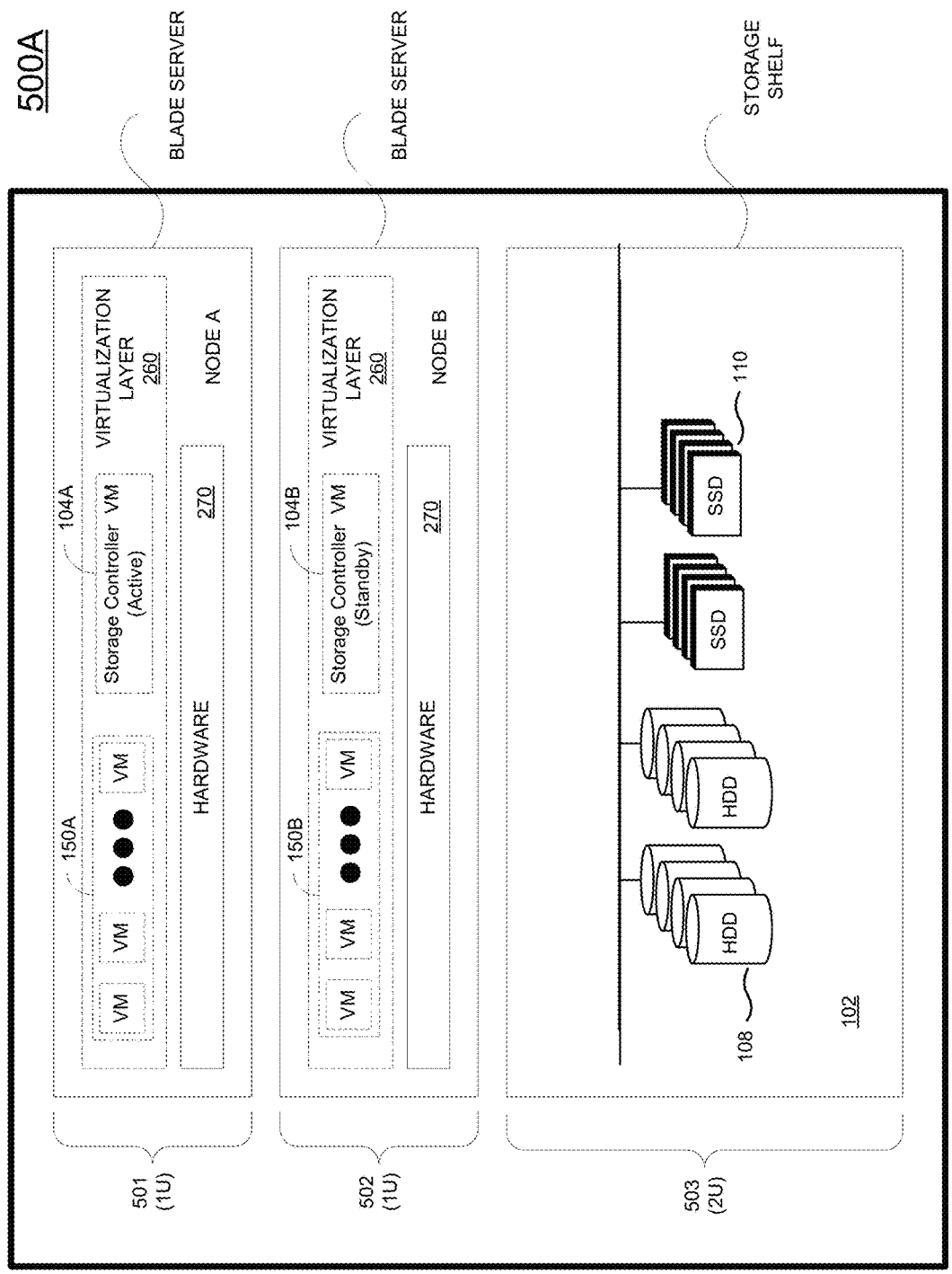
FIG. 5A illustrates one architecture facilitating a hyperconverged infrastructure including two nodes implemented on blade servers and providing virtual machines and virtualized storage controllers operating in active and standby mode, wherein the two nodes access shared storage, in accordance with one embodiment of the present disclosure.

FIG. 5A illustrates one architecture facilitating a hyperconverged infrastructure 500A including two nodes (e.g., node A and node B) implemented on blade servers and providing virtual machines and virtualized storage controllers operating in active and standby mode, wherein the two nodes access shared storage 102, in accordance with one embodiment of the present disclosure. HCI 500A may be implemented on one rack (not shown). As shown in FIG. 5A, instead of implementing an HCI within an integrated structure (e.g., a storage box), different functionalities are provided on different physical containers (e.g., chassis, etc.).

Figure 5B:
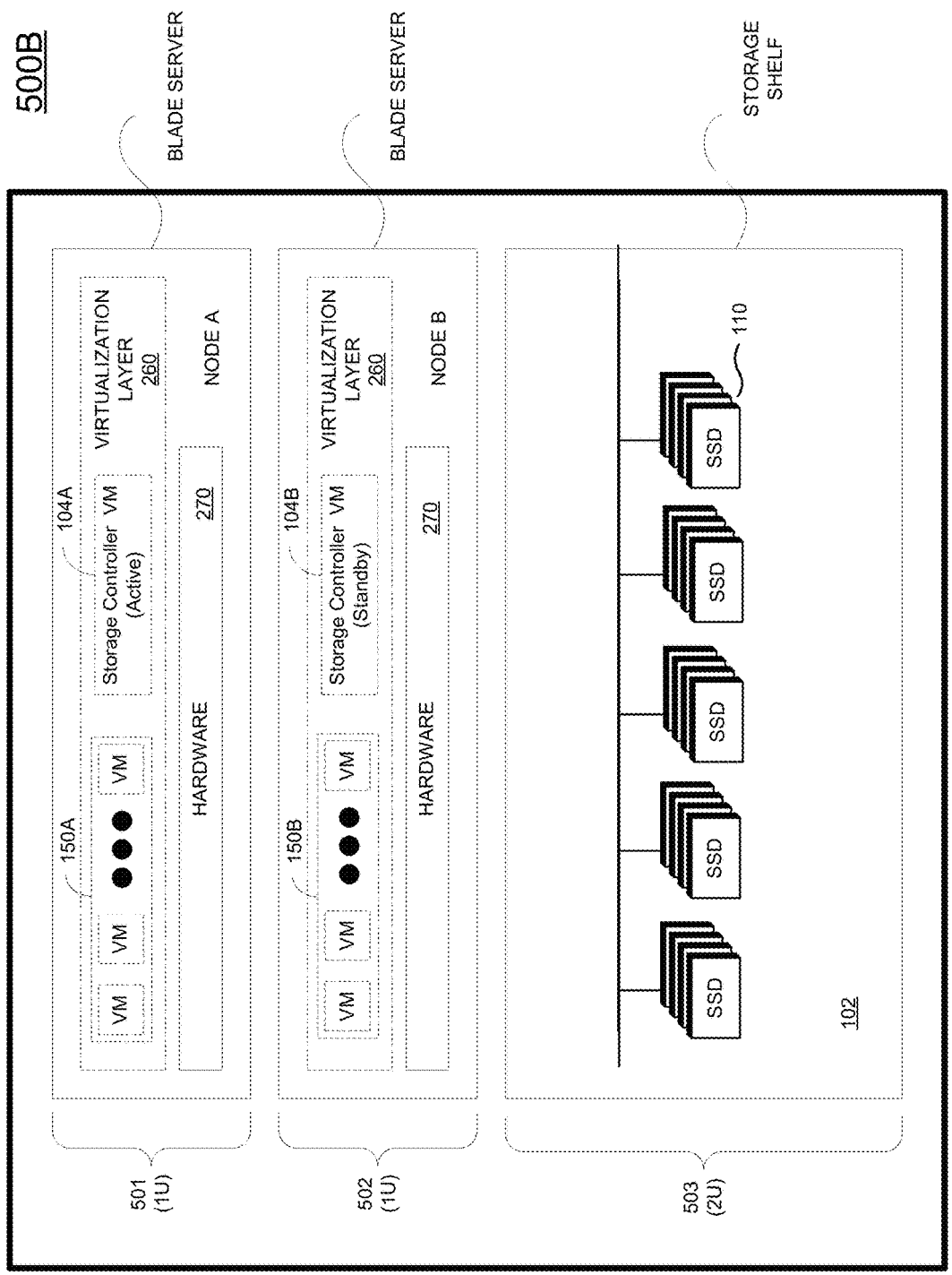
FIG. 5B illustrates an HCI infrastructure 500B including two nodes (e.g., node A and node B) implemented on blade servers and providing virtual machines and virtualized storage controllers operating in active and standby mode, wherein the two nodes access shared storage 102, in accordance with one embodiment of the present disclosure.

In particular, HCI 500A includes a storage array 102 (e.g., storage shelf) that is implemented on a 2U chassis 503 that is mounted on the rack, as shown in FIG. 5A. As previously described, the storage array 102 includes one or more hard disk drives 108 and/or one or more solid state drives 110. For example, the storage array 102 may be configured in a full flash memory configuration (see FIG. 5B), or in a hybrid configuration shown in FIG. 5A, wherein both configurations provide cache and permanent storage capabilities. As introduced, FIG. 5B illustrates an HCI infrastructure 500B including two nodes (e.g., node A and node B) implemented on blade servers and providing virtual machines and virtualized storage controllers operating in active and standby mode, wherein the two nodes access shared storage 102, in accordance with one embodiment of the present disclosure. The configuration of HCI 500B is similar to the configuration of HCI 500C, except that the storage array 102 is configured as an all flash cache memory, and does not include HDDs.

In both FIGS. 5A and 5B, node A and node B access the shared storage array 102. In particular, node A is implemented on a 1U chassis 501, and may be configured as a blade server that is mounted on the rack through a blade system (not shown). The blade server may be of any type, and typically provides computing resources. In addition, node B is implemented on a 1U chassis 502, and may be configured as a blade server that is mounted on the rack through a blade system (not shown). Nodes A and B are configured similarly, and include hardware 270 and a virtualization layer 260. Access and management of the storage array 102 is provided by virtual storage controllers 104A and 104B, in combination. For example, the virtual storage controllers 104A and 104B operating on node A and node B cooperatively manage access to the storage array 102, such as implementing an active/standby configuration on the storage controllers to provide robust access to the storage array 102. For example, the virtualization layer 260 in node A creates and manages the guest VMs 150A, and virtual storage controller 104A operating in active mode that is configured for handling IOs requesting access to the storage array 102, as previously described. Virtual storage controller 104A is configured in a pass-through mode to bypass the virtualization layer 260 and provide direct to the storage array 102. The virtualization layer 260 in node B creates and manages the guest VMs 150B, and virtual storage controller 104B operating in standby mode to the virtual storage controller 104A, as previously described. Virtual storage controller 104B is also configured in a pass-through mode to bypass the virtualization layer 260 and provide direct to the storage array 102.

Figure 5C:
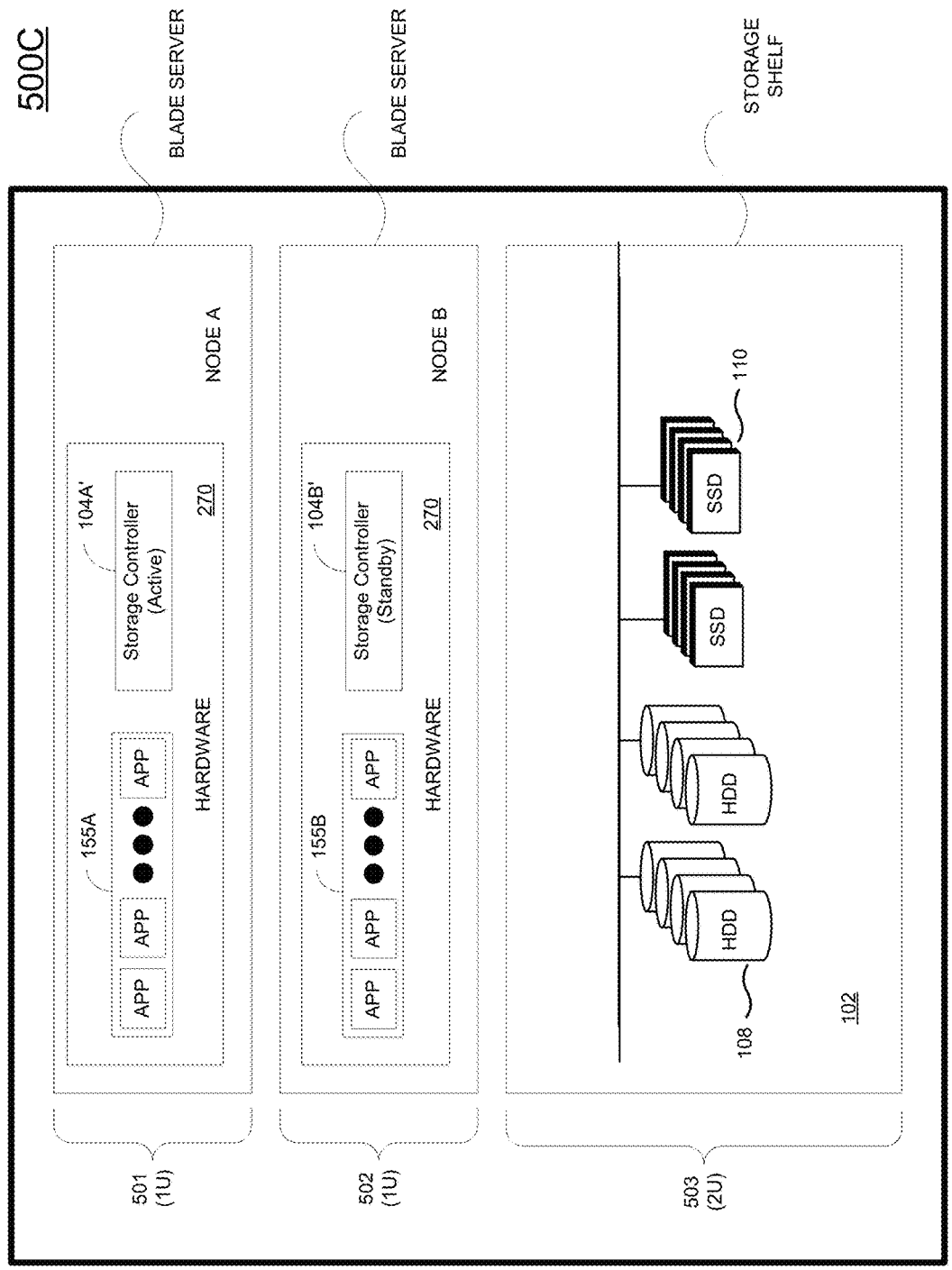
FIG. 5C illustrates one architecture facilitating a compute infrastructure 500C including two nodes (e.g., node A and node B) implemented on blade servers, in accordance with one embodiment of the present disclosure.

It is important to note that the software for the storage controller can be implemented in any form, such as executing on a VM, or executing on a non-virtualized operating system. In that manner, the storage controller functionality may be loaded onto any computing resource (e.g., local and/or remote), and used for managing a corresponding storage array local or remote from the storage controllers operating in an active/standby configuration. For example, FIG. 5C illustrates one architecture facilitating a compute infrastructure 500C including two nodes (e.g., node A and node B) implemented on blade servers, in accordance with one embodiment of the present disclosure. Applications on each node execute directly on the operating system of the corresponding hardware 270. For example, applications 155A execute on node A, and applications 155B execute on node B. In addition, storage controllers on node A and node B operate cooperatively in an active/standby configuration, wherein the two nodes access shared storage 102, in accordance with one embodiment of the present disclosure. For example, storage controller 140A' executes on the operating system of node A, and storage controller 140B' executes on the operation system of node B. In particular, each of the storage controllers 104A and 104B on node A and node B execute a storage operating system used to perform operating system functions when accessing the storage array 102 shared across node A and node B.

Figure 5D:
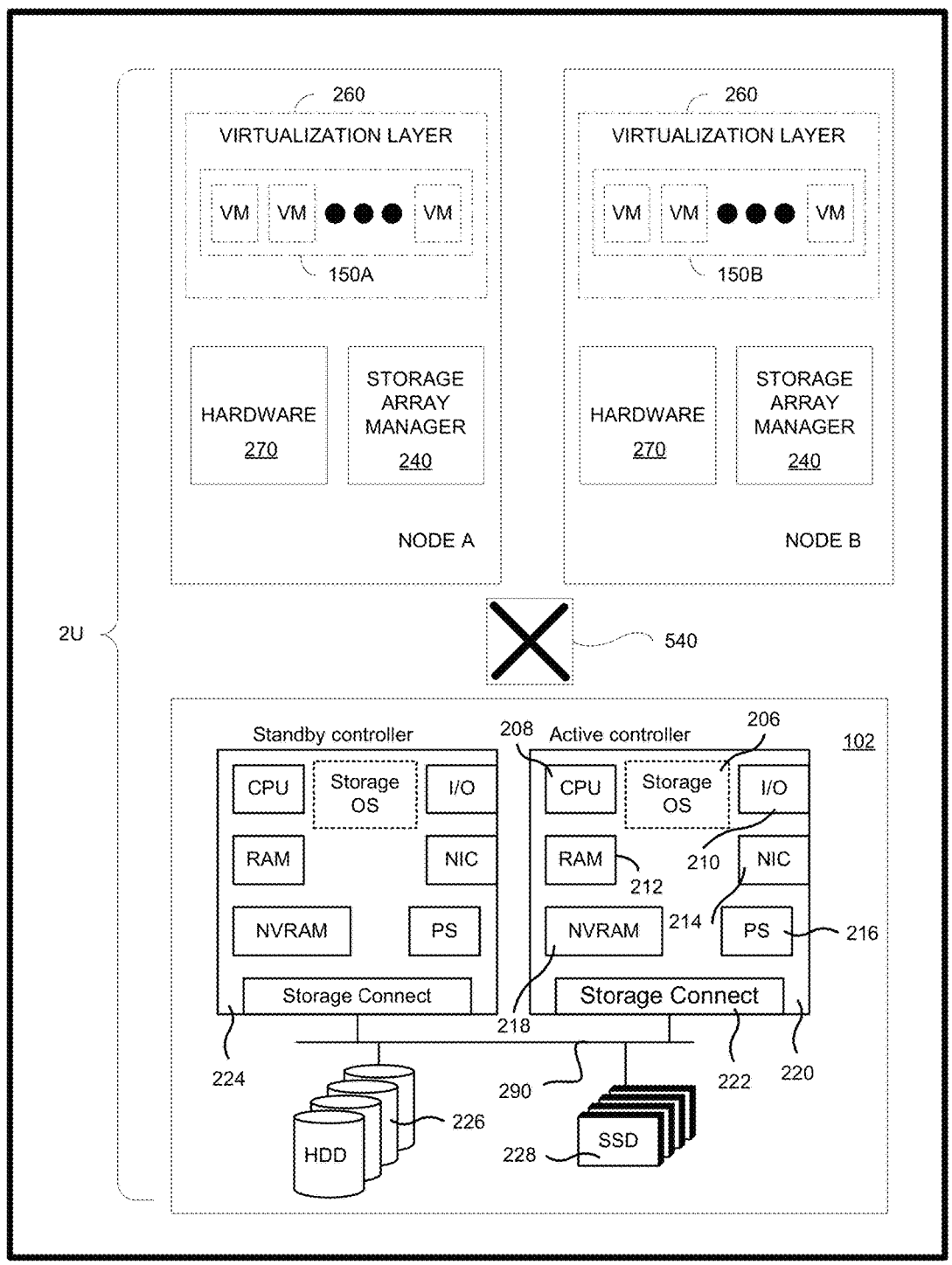
FIG. 5D illustrates another architecture facilitating a hyperconverged data storage system including two nodes providing virtual machines, wherein the two nodes access shared storage accessed through storage controllers operating in active and standby mode that are configured below any virtualization layer of the two nodes, in accordance with one embodiment of the present disclosure.

FIG. 5D illustrates another architecture facilitating a hyperconverged infrastructure 500D including two nodes (e.g., node A and node B) providing virtual machines, wherein the two nodes access shared storage 102 accessed through storage controllers operating in active and standby mode that are configured below any virtualization layer of the two nodes, in accordance with one embodiment of the present disclosure. In particular, HCI 500D may be implemented on one 2U chassis (not shown).

In particular, HCI 500D includes a storage array 102 (e.g., storage shelf). For example, storage array 102 may be implemented in a 1U form in the 2U chassis. As previously described, the storage array 102 includes one or more hard disk drives 108 and/or one or more solid state drives 110. For example, the storage array 102 may be configured in a full flash memory configuration, or a hybrid configuration, wherein both configurations provide cache and permanent storage capabilities.

In one embodiment, storage array 102 includes an active controller 220, a standby controller 224, one or more HDDs 226, and one or more SSDs 228. It is important to note that either controller can operate in the active mode, and either controller can operate in the standby mode, such that when both controllers are on-line one controller is designated as the active controller and functions to service IOs from one or more hosts, while the other controller remains in standby mode ready to step in and handle the IOs when a failure (real or instantiated) to the active controller occurs. As such, the active controller 220 and the standby controller 224 are configured similarly and mirrored appropriately, such that either controller when designated active can access (e.g., write, read, etc.) data stored in any of the storage mediums of the storage array 102, including a corresponding NVRAM, read cache SSD 228, and HDD 226 to serve IOs from hosts. In one embodiment, the active controller 220 includes NVRAM 218, which in one implementation is used for immediately storing the incoming data (e.g., write data) as it arrives to the storage array. In that manner, storage array 102 provides immediate acknowledgment of a write request to the requesting host. After the data is processed (e.g., compressed and organized in segments (e.g., coalesced)), the data is transferred from the NVRAM 218 to HDD 226, or to read cache SSD 228 if the data is determined to be cache worthy, or to both.

The active controller 220 includes various components that enable efficient processing of read and write requests. For instance, data from a write operation is stored first in the NVRAM 218 of active controller 220, and provides for immediate acknowledgment of acceptance and storage of the data back to the host, thereby providing increased storage system performance. Because the data is later stored in HDD 226 and/or SSD 228, a later read access will retrieve the data from the location giving the quickest access. For example, the data is retrieved from NVRAM 218 for the quickest response time if the data is still available.

In addition, the active controller 220 further includes CPU 208, general-purpose RAM 212 (e.g., used by the programs executing in CPU 208), input/output module 210 for communicating with external devices (e.g., USB port, terminal port, connectors, plugs, links, etc.), one or more network interface cards (NICs) 214 for exchanging data packages through network 256, one or more power supplies 216, a temperature sensor (not shown), and a storage connect module 222 for sending and receiving data to and from the HDD 226 and SSD 228. In one embodiment, standby controller 224 includes the same components as active controller 220.

In one embodiment, bus 290 provides connectivity between the components of the active controller 220 and the components of the standby controller 224, for example to implement an active/standby array configuration, wherein the active controller 220 services IO requests from one or more hosts and the standby controller 224 services write cache mirroring requests (e.g., mirrors writes to NVRAM 218 to NVRAM 299) while remaining ready to assume the primary responsibility of servicing IOs when a failure occurs at the active controller 220.

Active controller 220 is configured to execute one or more computer programs stored in RAM 212. One of the computer programs is the storage operating system (OS) used to perform operating system functions for the active controller device. In some implementations, one or more expansion shelves (not shown) may be coupled to storage array 102 to increase HDD capacity, or SSD capacity, or both.

In one embodiment, active controller 220 and standby controller 224 have their own NVRAMs, but they share HDDs 226 and SSDs 228. In another embodiment, the NVRAMs are located on the shared SSDs, and not on each controller 220 and 224, as described below in FIGS. 7A and 7B. The standby controller 224 receives copies of what gets stored in the NVRAM 218 of the active controller 220 and stores the copies in its own NVRAM 299. If the active controller 220 fails, standby controller 224 takes over the management of the storage array 102. For example, one or both of the failover managers 134 in the controllers 220 and 224 implement and/or manage the failover process. When servers, also referred to herein as hosts, connect to the storage array 102, read/write requests (e.g., IO requests) are sent over network 256, and the storage array 102 stores the sent data or sends back the requested data to host 204.

Node A and node B access the shared storage array 102. Node A and node B are implemented in 1U form in the 2U chassis. Nodes A and B are configured similarly, and include hardware 270 and a virtualization layer 260. For example, the virtualization layer 260 in node A creates and manages the guest VMs 150A. The virtualization layer 260 in node B creates and manages the guest VMs 150B. A communication network 540 facilitates communication between node A, node B, and the storage array 102. Because the components of HCI 500D are localized through the communication network 540, local access to the storage array 102 is performed without communicating over an external network.

Figure 6:
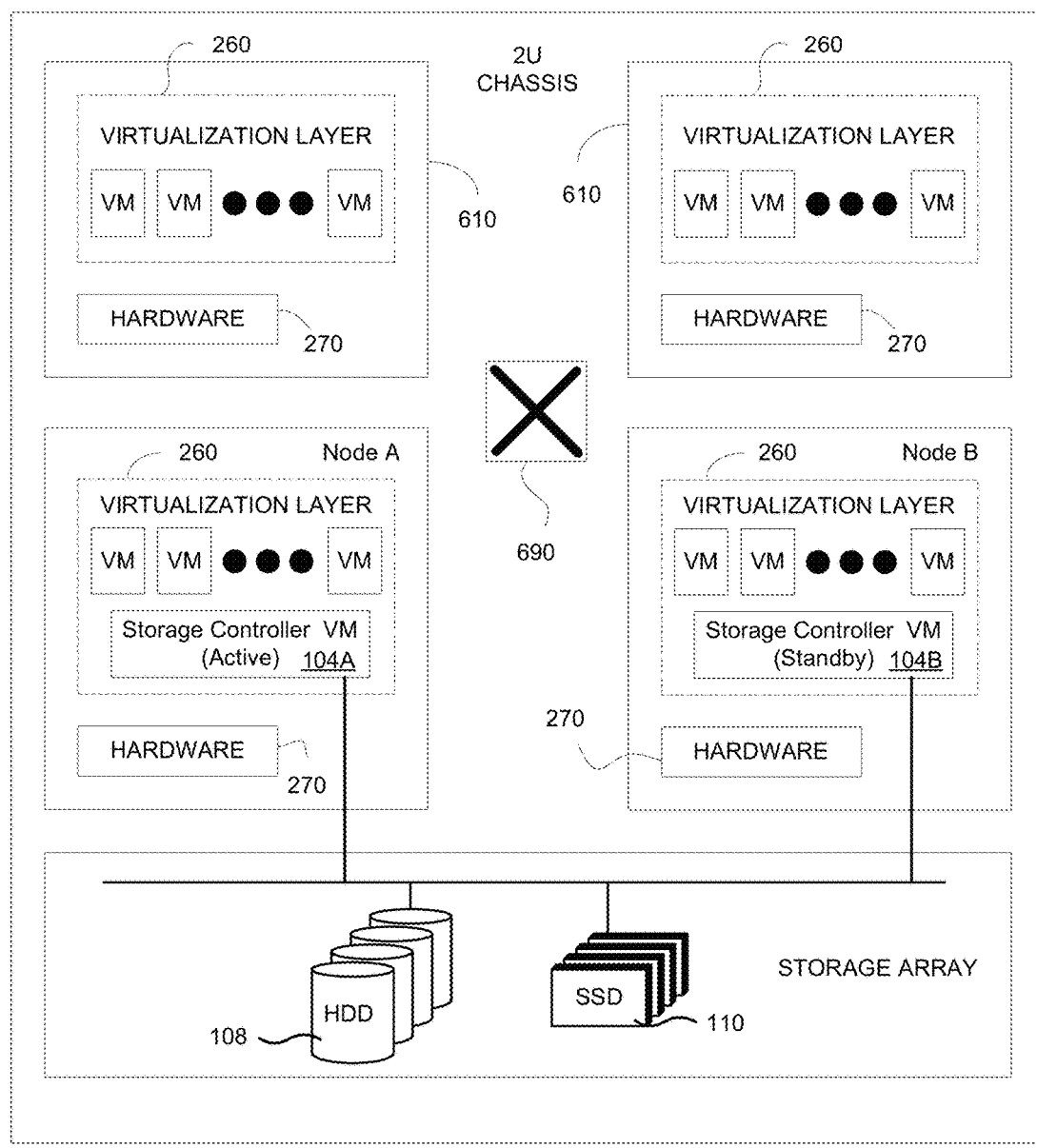
FIG. 6 illustrates a scale out process for a hyperconverged data storage system including at least two nodes providing virtual machines, wherein all the nodes access shared storage accessed through storage controllers operating in active and standby mode, in accordance with one embodiment of the present disclosure.

FIG. 6 illustrates a scale out process for a hyperconverged infrastructure 600 including at least two nodes providing virtual machines, wherein all the nodes access shared storage accessed through storage controllers operating in active and standby mode, in accordance with one embodiment of the present disclosure. HCI 600 includes two nodes (e.g., node A and node B) providing virtualization for supporting a plurality of guest VMs. For example, node A includes hardware 270 and a virtualization layer 260 that creates and manages one or more guest VMs that are executing applications. Also, node B includes hardware 270 and a virtualization layer 260 that creates and manages one or more guest VMs that are executing applications. HCI 600 is implemented within a single 2U chassis in one embodiment.

Node A and node B are configured for providing access to storage array 102. The configuration of node A, node B, and the storage array 102 is similar to HCI 200 of FIG. 2A. For example, storage controllers on node A and node B are configured in active and standby modes when providing access and control to the storage array 102. In particular, storage array 102 of HCI 600 includes one or more HDDs 108 and/or one or more SSDs 110. For example, storage array 102 may be configured as an all flash memory system including a plurality of SSDs configured for supporting cache storage and permanent storage. In another example, the storage array 102 is configured as a hybrid system including a plurality of SSDs configured for supporting cache storage, and a plurality of HDDs configured for supporting permanent storage. Access and management of the storage array 102 is provided by virtual storage controller 104A on node A and virtual storage controller 104B operating on node B. In particular, virtual storage controller 104A executing in the virtualization layer 260 of node A operates in an active mode and is configured for handling IOs requesting access to the storage array. The IOs originate from applications both from node A, node B, and any expansion nodes 610 attached to the local communication network 690. The virtual storage controller 104A is configured in a pass-through mode to bypass the virtualization layer 260. Virtual storage controller 104B executing in the virtualization layer 260 of node operates in standby mode to the virtual storage controller 104A, as previously described.

For purposes of scaling out compute resources, local communication network 690 provides communication between the nodes (e.g., node A, node B, and one or more expansion nodes 610). Each of the expansion nodes 610 includes hardware 270 and a virtualization layer 260 supporting a plurality of VMs. Each virtualization layer 260 of a corresponding expansion node 610 is configured to manage and allocate resources from corresponding hardware 270 for utilization by the corresponding VMs. IOs generated by the applications of VMs for the expansion nodes 610 are serviced through the active virtual storage controller 104A. In particular, IOs generated by applications in the expansion nodes 610 are delivered over the local communication network 690 to the active virtual storage controller 104A. As such, within the same 2U chassis, there are four servers providing compute resources.

Write Buffering

Figure 7A:
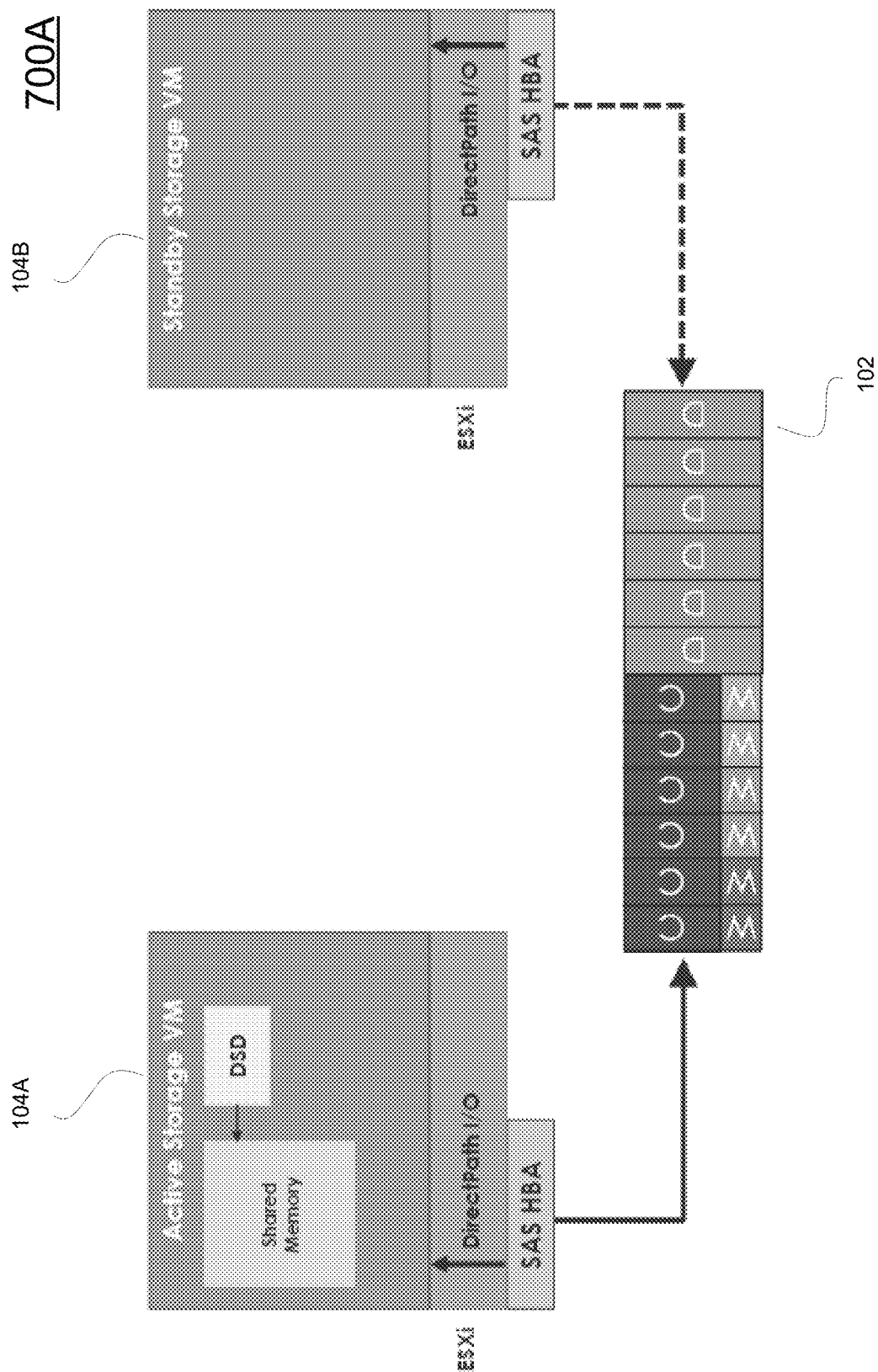
FIG. 7A illustrates a write-buffering mechanism including partitioning a portion of each solid state drive (SSD) for write-buffering in a hyperconverged data storage system including two nodes providing virtual machines, wherein the two nodes access shared storage, in accordance with one embodiment of the present disclosure.
Figure 7B:
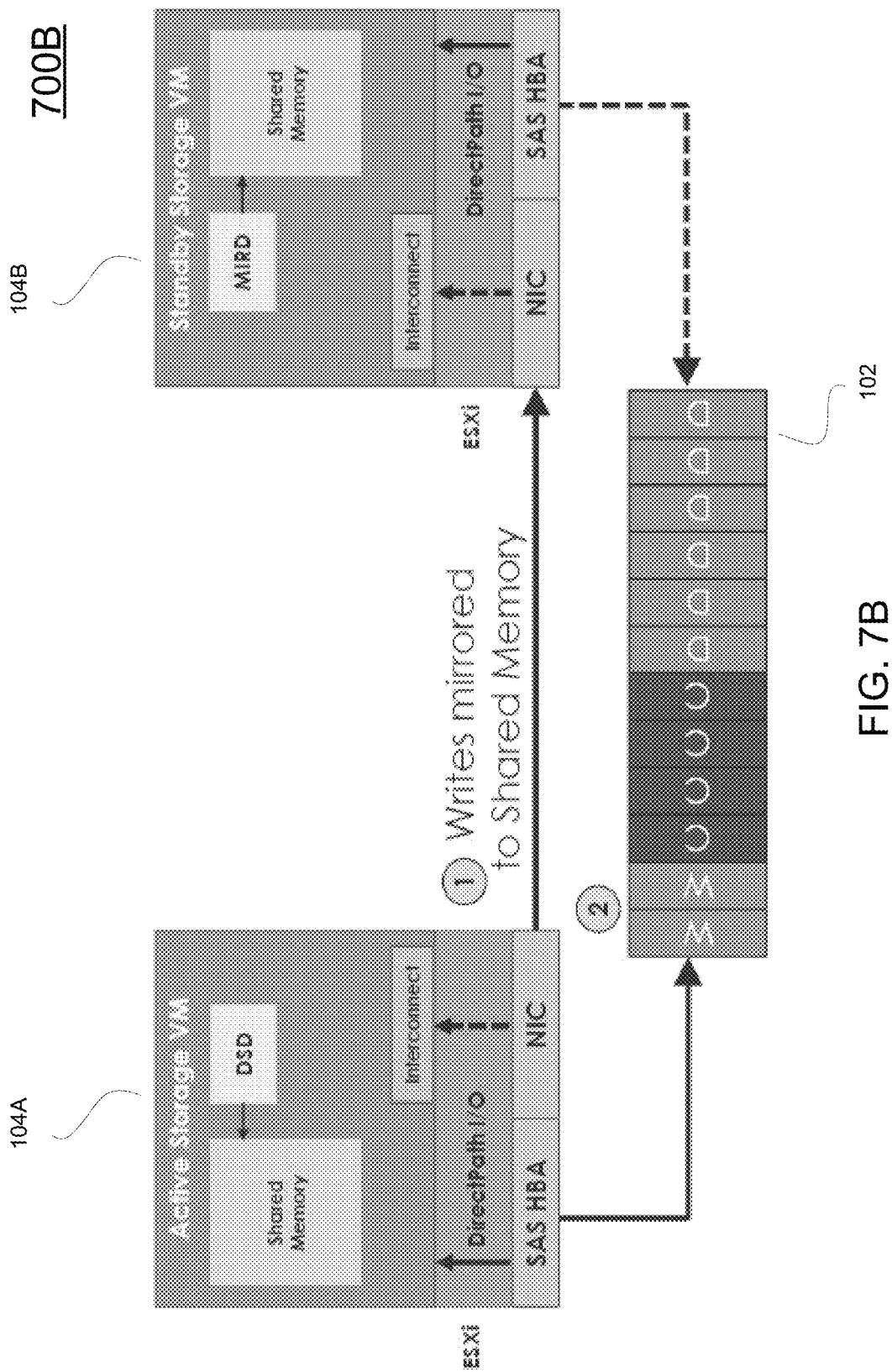
FIG. 7B illustrates a write-buffering mechanism including reserving at least two solid state drives (SSDs) for write-buffering in a hyperconverged data storage system including two nodes providing virtual machines, wherein the two nodes access shared storage, in accordance with one embodiment of the present disclosure.
Figures 1, 7B:
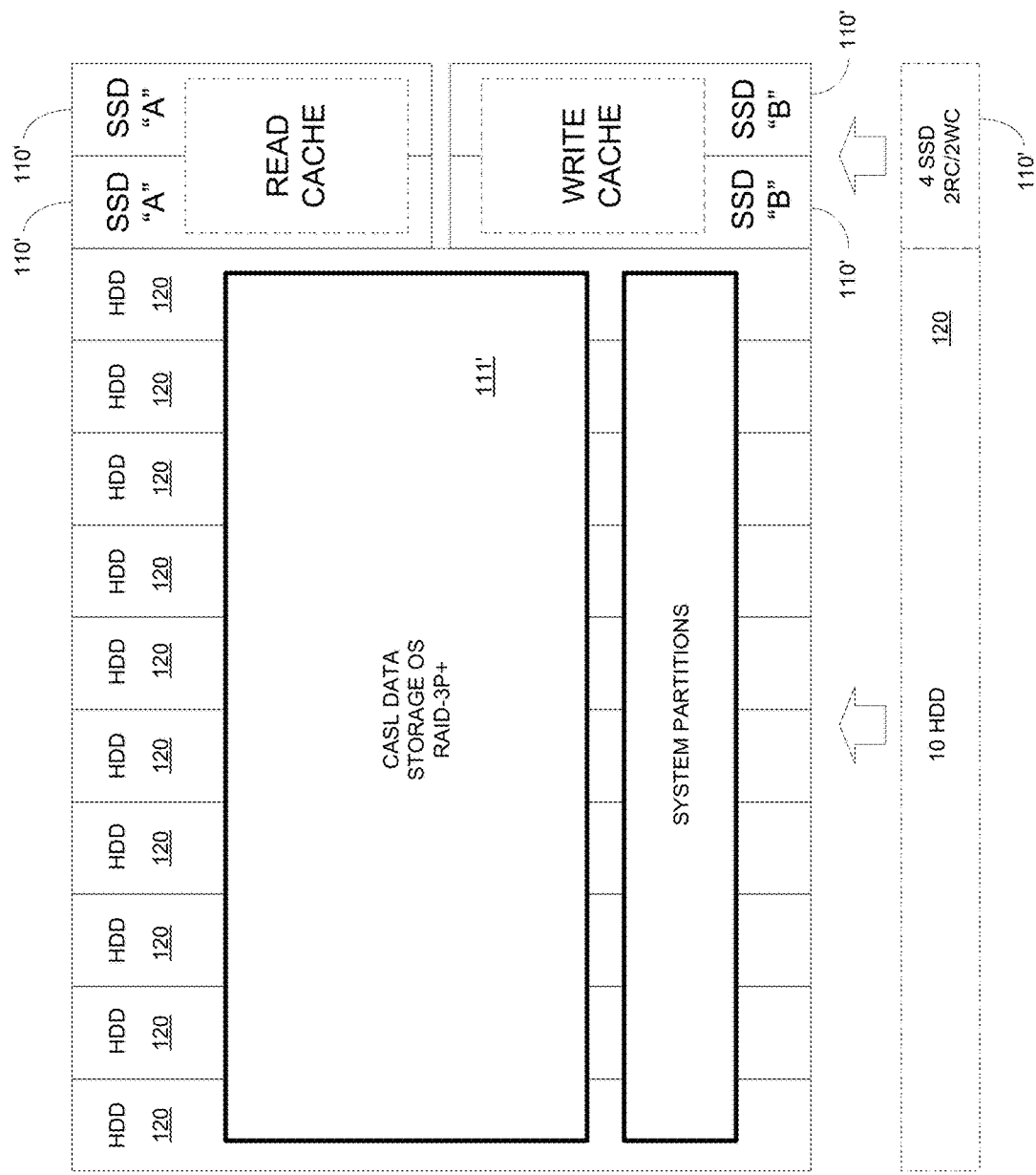

FIGS. 7A and 7B illustrate a write-buffering mechanism utilized by the hyperconverged infrastructures of FIGS. 1-6, according to embodiments. Both storage systems 700A of FIG. 7A and storage system 700B of FIG. 7B include a storage array 102, and two storage VMs (e.g., virtual storage controllers), one operating in active mode (storage VM 710) and one operating in standby mode (e.g., storage VM 720). For purposes of brevity and clarity, only the storage system are shown in FIGS. 7A and 7B, without showing the virtualized host systems (e.g., guest VMs) that are also operating within the hyperconverged infrastructure, previously introduced in relation to FIGS. 1-6.

As previously described, the storage array 102 of storage systems 700A and 700B includes one or more HDDs and/or one or more SSDs. For example, SSDs are shown in the boxes marked "C", representing flash cache, and HDDs are shown in boxed marked with "D". In one embodiment, the storage array 102 can be configured as an all flash system including a plurality of SSDs configured for supporting cache storage and permanent storage. In another embodiment, the storage array 102 can be configured as a hybrid system including a plurality of SSDs configured for supporting cache storage, and a plurality of HDDs configured for supporting permanent storage. Spare disks may be added for recovery protection. Access and management of the storage array 102 is provided by storage VMs 104A and 104B, wherein storage VM 104A operates in an active mode and is configured for handling IOs requesting access to the storage array 102. Storage VM 104B operates in a standby mode to storage VM 104A. The storage VMs 104A and 104B may operate within nodes (e.g., node A and node B), wherein each node provides VMs and storage access via a corresponding storage VM.

In a write operation, the write is first optionally stored in shared memory (e.g., shadow RAM), and then buffered in SSDs for processing and quick access. In other embodiments, writes are immediately stored to the write buffer upon receipt. FIGS. 7A and 7B illustrate two write buffering architectures and methods. For example, incoming data (e.g., write data) is immediately buffered to write cache (marked "W") as it arrives to the storage array 102. In that manner storage array 102 provides immediate acknowledgment of a write request to the requesting host. After the data is processed (e.g., compressed and organized in segments (e.g., coalesced)), the data is transferred from the write buffer to HDD (marked ("D"), or to read flash cache SSD (marked "C") if the data is determined to be cache worthy, or to both. Because the data is later stored in HDD ("D") and/or flash cache SSD ("C"), a later read access will retrieve the data from the location giving the quickest access. For example, the data is first retrieved from the write buffer ("W") for the quickest response time if the data is still available, or from the read cache SSD ("C") if still available and not found in the write buffer, and then finally from HDD ("D") if not found in either the write buffer or read cache SSD ("C").

In particular, FIG. 7A illustrates a write-buffering mechanism including partitioning a portion of each solid state drive (SSD) for write-buffering in a hyperconverged data storage system including two nodes providing virtual machines, wherein the two nodes access shared storage, in accordance with one embodiment of the present disclosure. As shown in FIG. 7A, a small partition is created for write buffers on each SSD. Remaining portions of the SSD are configured as read caches ("C"). Writes can be striped across two or more SSDs (e.g., RAID 0), in one embodiment. In one embodiment, a write is striped across a pair of SSDs. Parity may be added for redundancy. Mirroring is unnecessary, but may be performed for added redundancy. For example, a write may be striped across a pair of SSDs, and then mirrored to other drives (e.g., RAID 1+0).

FIG. 7A-1 illustrates a write-buffering mechanism including partitioning a portion of each SSD (e.g., shared configuration) for write-buffering in a hyperconverged data storage system including all SSDs, such as an all flash array (AFA) (e.g., flash cache), in accordance with one embodiment of the present disclosure. As shown, the data storage system includes all SSDs 110. In one configuration, there are 12 SSDs 110. For example, each SSD 110 may be partitioned into a write cache 112 (e.g., NVRAM) of approximately 10 percent (e.g., 5 gigabytes-GB) of the raw capacity of SSD 110, and a journal portion 111 for data (e.g., stored in RAID 3P+ configuration) (e.g., 5 GB, which is approximately five times the size of NVRAM 110). This enables an overprovisioning level of approximately 20 percent. The write caches 112 are striped together across all the SSDs 110.

Further, FIG. 7B illustrates a write-buffering mechanism including reserving at least two solid state drives (SSDs) for write-buffering in a hyperconverged data storage system including two nodes providing virtual machines, wherein the two nodes access shared storage, in accordance with one embodiment of the present disclosure. As shown in FIG. 7B, two or more dedicated SSDs are reserved for write buffering, and are marked "W". In a first operation, a write may be mirrored across the storage VMs 104A and 104B within corresponding shared memories (e.g., shadow RAM). In a second operation, a write is stored in one or more write buffers "W", and one or more RAID configurations for storing may be implemented for redundancy. In one embodiment, a write is stored in one SSD and mirrored to another SSD. In another embodiment, a write is striped across the dedicated SSDs ("W"), along with parity bits for redundancy.

FIG. 7B-1 illustrates a write-buffering mechanism including dedicating a portion of a hybrid array for write-buffering (and also read-buffering) in a hyperconverged data storage system, in accordance with one embodiment of the present disclosure. As shown, the data storage system includes HDDs 120 and SSDs 110', wherein write-buffering and read-buffering is performed by at least a portion of the SSDs 110'. In one configuration, there are ten HDDs 120, and four SSDs 110'. In one configuration, the SSD count is 2 (e.g., B slot on each of 2DFC bays), the NVRAM size is 500 MB, the journal size is 1.5 GB (e.g., 3×NVRAM), and total size of write cache is 4 GB (e.g., 2 GB per SSD).

Installation of HCI Architecture

A method is disclosed for customer installation of an HCI architecture, in accordance with one embodiment of the present disclosure. In particular, a storage box is shipped initially configured with physical storage and compute hardware. The storage box may be configured as two physical nodes, each having its own compute hardware, wherein the nodes access the shared, physical storage. A storage operating system is installed on memory of the compute hardware of each node. The storage operating system on each node performs operating system functions for the corresponding storage controller when accessing the storage array 102 shared across the two nodes A and B. The storage operating system 106 is a multitasking system able to execute several tasks concurrently, wherein one or more tasks are configured to process IO requests. The storage operating system in combination may be configured in an active mode and standby mode. The active controller functions to service IOs from one or more hosts, while the other controller remains in standby mode ready to step in and handle the IOs when a failure to the active controller occurs.

In embodiments, the storage operating systems operating in active mode and standby mode are moved to virtualization layers on nodes A and B in an HCI configuration. In particular, after shipping, customer installation of the HCI architecture is performed by invoking a HCI wizard installed on the shipped data storage system. The wizard enables installation of the virtualization layers on the physical node A and node B, and installation of the virtual storage controllers on the nodes. For example, virtualization may be initiated through a side-load operation.

In one embodiment, the original storage operating systems remain on the system. In that case, when the HCI architecture fails, the storage array may be accessed using the originally configured storage array controllers.

Accordingly, embodiments of the present disclosure disclosing a hyperconverged infrastructure (HCI) that provides both compute and storage in a localized system, wherein the HCI includes two nodes including virtualization layers supporting virtual machines and virtual storage controllers, and a physical data storage accessible outside of the virtualized space. While specific embodiments have been provided to demonstrate an HCI architecture providing both compute and storage in a localized system, these are described by way of example and not by way of limitation. Those skilled in the art having read the present disclosure will realize additional embodiments falling within the spirit and scope of the present disclosure.

With the above embodiments in mind, it should be understood that the disclosure can employ various computer-implemented operations involving data stored in computer systems. These operations are those requiring physical manipulation of physical quantities. Any of the operations described herein that form part of the disclosure are useful machine operations. The disclosure also relates to a device or an apparatus for performing these operations. The apparatus can be specially constructed for the required purpose, or the apparatus can be a general-purpose computer selectively activated or configured by a computer program stored in the computer. In particular, various general-purpose machines can be used with computer programs written in accordance with the teachings herein, or it may be more convenient to construct a more specialized apparatus to perform the required operations.

One or more embodiments can also be fabricated as computer readable code on a non-transitory computer readable storage medium. The non-transitory computer readable storage medium is any non-transitory data storage device that can store data, which can be thereafter be read by a computer system. Examples of the non-transitory computer readable storage medium include hard drives, network attached storage (NAS), read-only memory, random-access memory, CD-ROMs, CD-Rs, CD-RWs, magnetic tapes and other optical and non-optical data storage devices. The non-transitory computer readable storage medium can include computer readable storage medium distributed over a network-coupled computer system so that the computer readable code is stored and executed in a distributed fashion.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

What is claimed is:

1. A data storage system, comprising:
   a storage array;
   a first node comprising first hardware and a first virtualization layer supporting a first plurality of guest virtual machines utilizing the first hardware and running a plurality of first applications, wherein the first hardware includes a first central processing unit (CPU), wherein the first virtualization layer supports a first virtual storage controller operating in an active mode and configured for handling IOs requesting access to the storage array;
   a second node comprising second hardware and a second virtualization layer supporting a second plurality of guest virtual machines utilizing the second hardware and running a plurality of second applications, wherein the second hardware includes a second central processing unit (CPU), wherein the second virtualization layer supports a second virtual storage controller operating in an standby mode to the first virtual storage controller;
   an internal communication network facilitating communications between the first node and the second node; and
   wherein the first virtual storage controller when operating in active mode is configured for handling the IOs originating from the first applications and the second applications and accessing the storage array.

2. The data storage system of claim 1, wherein the second virtual storage controller sends and receives over the internal communication network a plurality of communications associated with the IOs originating from the second applications to and from the first virtual storage controller for accessing the storage array.

3. The data storage system of claim 1, wherein the first virtual storage controller and the second virtual storage controller both have simultaneous access to the storage array.

4. The data storage system of claim 1, wherein the first virtual storage controller is configured in a pass-through mode for direct iSCSI access to the storage array that bypasses the first virtualization layer.

5. The data storage system of claim 1, wherein the storage array is configured in one of a plurality of RAID configurations for data persistence.

6. The data storage system of claim 1, wherein the storage array comprises a plurality of solid state drives (SSDs) configured for supporting cache storage and permanent storage.

7. The data storage system of claim 1, wherein the storage array comprises a plurality of solid state drives (SSDs) configured for supporting cache storage and a plurality of hard disk drives (HDDs) configured for supporting permanent storage.

8. The data storage system of claim 1, wherein the second virtual storage controller is configured to operate in the active mode to handle the IOs when the first virtual storage controller fails, wherein the second virtual storage controller is configured in a pass-through mode for direct iSCSI access to the storage array that bypasses the second virtualization layer.

9. The data storage system of claim 8, wherein execution of the first plurality of guest virtual machines is migrated to the second node when the first node fails.

10. The data storage system of claim 1, wherein a state of the first virtual storage controller operating in active mode is mirrored to the second virtual storage controller operating in standby mode.

11. A data storage system, comprising:
    a storage array;
    a first node comprising first hardware, wherein the first hardware includes a first central processing unit (CPU);
    a second node comprising second hardware, wherein the second hardware includes a second CPU; and
    an internal communication network facilitating communications between the first node and the second node;
    wherein the first CPU is to execute instructions on a first computer readable storage medium to:
       operate on the first node a first virtualization layer supporting a first plurality of guest virtual machines utilizing the first hardware and running a plurality of first applications;
       instantiate in the first virtualization layer a first virtual storage controller operating in an active mode and configured for handling IOs requesting access to the storage array;
    wherein the second CPU is to execute instructions on a second computer readable storage medium to:
       operate on the second node a second virtualization layer supporting a second plurality of guest virtual machines utilizing the second hardware and running a plurality of second applications;
       instantiate in the second virtualization layer a second virtual storage controller operating in an standby mode to the first virtual storage controller; and
    wherein the first CPU is further to execute instructions on the first computer readable storage medium to configure the first virtual storage controller, when operating in an active mode, to handle IOs from the first applications and the second applications and accessing the storage array.

12. The data storage system of claim 11, wherein the first virtual storage controller and the second virtual storage controller both have simultaneous access to the storage array.

13. The data storage system of claim 11, wherein the first virtual storage controller is configured for direct iSCSI access in a pass-through mode to the storage array that bypasses the first virtualization layer.

14. The data storage system of claim 11, wherein the storage array comprises a plurality of solid state drives (SSDs) configured for supporting cache storage and permanent storage.

15. The data storage system of claim 11, wherein the storage array comprises a plurality of solid state drives (SSDs) configured for supporting cache storage and a plurality of hard disk drives (HDDs) configured for supporting permanent storage.

16. The data storage system of claim 11, wherein the second virtual storage controller is configured to operate in the active mode to handle the IOs when the first virtual storage controller fails, wherein the second virtual storage controller is configured for direct iSCSI access to the storage array in a pass-through mode that bypasses the second virtualization layer.

17. A method for data storage, comprising:
    providing a storage array;
    providing a first node comprising first hardware, wherein the first hardware includes a first central processing unit (CPU);
    providing a second node comprising second hardware, wherein the second hardware includes a second CPU;

providing an internal communication network facilitating communications between the first node and the second node;

operating on the first node a first virtualization layer supporting a first plurality of guest virtual machines utilizing the first hardware and running a plurality of first applications;

instantiating in the first virtualization layer a first virtual storage controller operating in an active mode and configured for handling IOs requesting access to the storage array;

operating on the second node a second virtualization layer supporting a second plurality of guest virtual machines utilizing the second hardware and running a plurality of second applications;

instantiating in the second virtualization layer a second virtual storage controller operating in an standby mode to the first virtual storage controller; and configuring the first virtual storage controller when operating in active mode to handle IOs from the first applications and the second applications and accessing the storage array.

18. The method of claim 17, further comprising:
configuring the first virtual storage controller for direct iSCSI access in a pass-through mode to the storage array that bypasses the first virtualization layer.

19. The method of claim 17, further comprising:
providing simultaneous access to the storage array for the first virtual storage controller and the second virtual storage controller.

20. The method of claim 17, further comprising:
operating the second virtual storage controller in the active mode to handle the IOs when the first virtual storage controller fails, wherein the second virtual storage controller is configured for direct iSCSI access to the storage array in a pass-through mode that bypasses the second virtualization layer.

21. The method of claim 17, wherein the storage array comprises a plurality of solid state drives (SSDs) configured for supporting cache storage and permanent storage.

22. The method of claim 17, wherein the storage array comprises a plurality of solid state drives (SSDs) configured for supporting cache storage and a plurality of hard disk drives (HDDs) configured for supporting permanent storage.

* * * * *